US012770400B2

(12) United States Patent
Wang et al.

(10) Patent No.: US 12,770,400 B2
(45) Date of Patent: Oct. 20, 2026

(54) CONTROL METHOD AND APPARATUS FOR BROADCAST MONITORING SYSTEM AND COMPUTING AND MEMORY SYSTEM

(71) Applicants: Beijing BOE Technology Development Co., Ltd., Beijing (CN); BOE TECHNOLOGY GROUP CO., LTD., Beijing (CN)

(72) Inventors: Tingting Wang, Beijing (CN); Guangwei Huang, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 273 days.

(21) Appl. No.: 18/705,536

(22) PCT Filed: May 31, 2023

(86) PCT No.: PCT/CN2023/097467
§ 371 (c)(1),
(2) Date: Apr. 27, 2024

(87) PCT Pub. No.: WO2024/243860
PCT Pub. Date: Dec. 5, 2024

(65) Prior Publication Data
US 2026/0127883 A1 May 7, 2026

(51) Int. Cl.
*G06V 20/52* (2022.01)
*G06N 3/08* (2023.01)
(Continued)

(52) U.S. Cl.
CPC ............... *G06V 20/52* (2022.01); *G06N 3/08* (2013.01); *G06T 3/40* (2013.01); *G06T 7/11* (2017.01);
(Continued)

(58) Field of Classification Search
CPC ........ G06V 20/52; G06V 10/82; G06V 20/70; G06V 2201/07; G06N 3/08; G06T 3/40; G06T 7/11; G06T 7/20
See application file for complete search history.

(56) References Cited

U.S. PATENT DOCUMENTS

2019/0122064 A1* 4/2019 Ishikawa ................ H04N 23/80
2020/0302230 A1* 9/2020 Chang ................... G06F 18/214
(Continued)

*Primary Examiner* — Han Hoang
(74) *Attorney, Agent, or Firm* — HOUTTEMAN LAW LLC

(57) ABSTRACT

The present disclosure provides a control method and apparatus for a broadcast monitoring system, a computer device and a storage medium, and belongs to the field of image recognition and terminal broadcast monitoring technology. The control method includes: acquiring an image to be detected; dividing the image to be detected into a plurality of target sub-images according to a shooting visual angle of a shooting device for shooting the image to be detected; processing each of the target sub-images by using a pre-trained target neural network model to obtain a recognition result for the target sub-image; and obtaining a detection result of whether a target object exists in the image to be detected or not based on the recognition result corresponding to each target sub-image, and sending the detection result to a terminal so that the terminal determines a display state at least based on the detection result.

16 Claims, 5 Drawing Sheets

(51) Int. Cl.

| | |
|---|---|
| ***G06T 3/40*** | (2006.01) |
| ***G06T 7/11*** | (2017.01) |
| ***G06T 7/20*** | (2017.01) |
| ***G06V 10/82*** | (2022.01) |
| ***G06V 20/70*** | (2022.01) |

(52) U.S. Cl.
CPC ................ *G06T 7/20* (2013.01); *G06V 10/82* (2022.01); *G06V 20/70* (2022.01); *G06V 2201/07* (2022.01)

(56) References Cited

U.S. PATENT DOCUMENTS

| | | | | |
|---|---|---|---|---|
| 2023/0162005 | A1* | 5/2023 | Cheng | G06F 16/9035 706/15 |
| 2023/0269462 | A1* | 8/2023 | Xu | G06V 10/147 348/372 |
| 2024/0005648 | A1* | 1/2024 | Bondugula | G06N 3/096 |

* cited by examiner

CONTROL METHOD AND APPARATUS FOR BROADCAST MONITORING SYSTEM AND COMPUTING AND MEMORY SYSTEM

FIELD OF THE DISCLOSURE

The present disclosure relates to the field of image recognition and terminal broadcast (playback) monitoring technology, in particular to a control method for a broadcast monitoring system, a control apparatus for a broadcast monitoring system and a computing and memory system.

BACKGROUND OF THE DISCLOSURE

With the rapid development of information technology, a modern electronic device has been also rapidly developing towards the intellectualization, the light weight and the portability. For an intelligent terminal, a display screen displays a monitoring picture for a long time, so that the power consumption of the system is large, and the service life of the system is adversely influenced. Therefore, an urgent technical problem to be solved in the broadcast monitoring field is to realize the operation with the low power consumption.

SUMMARY OF THE DISCLOSURE

The present disclosure is to solve at least one of the technical problems in the prior art, and provides a control method for a broadcast monitoring system, a control apparatus for a broadcast monitoring system and a computing and memory system.

In a first aspect, the technical solution adopted for solving the technical problems of the present disclosure is a control method for a broadcast monitoring system, which includes: acquiring an image to be detected; dividing the image to be detected into a plurality of target sub-images according to a shooting visual angle of a shooting device for shooting the image to be detected; processing each of the plurality of target sub-images by using a pre-trained target neural network model to obtain a recognition result for the target sub-image; and obtaining a detection result of whether a target object exists in the image to be detected or not based on the recognition result corresponding to each target sub-image, and sending the detection result to a terminal, so that the terminal determines a display state at least based on the detection result.

In some embodiment, dividing the image to be detected into the plurality of target sub-images according to the shooting visual angle of the shooting device, includes: dividing the image to be detected into a first sub-region, a second sub-region and a third sub-region arranged sequentially along a first direction, in response to the shooting visual angle being within a preset visual angle range, wherein the first sub-region and the third sub-region partially overlap with the second sub-region, a width of the first sub-region in the first direction is equal to a width of the third sub-region in the first direction, and a width of the second sub-region in the first direction is greater than the width of the first sub-region in the first direction, and the first direction is a height direction of the image to be detected; dividing a part of the image to be detected in the first sub-region into a plurality of first sub-images arranged side by side along a second direction, wherein widths of at least part of the first sub-images in the second direction are the same, and the second direction is a width direction of the image to be detected; dividing a part of the image to be detected in the second sub-region into a plurality of second sub-images arranged side by side along the second direction, wherein widths of at least part of the second sub-images in the second direction are the same; and dividing a part of the image to be detected in the third sub-region into a plurality of third sub-images arranged side by side along the second direction, wherein widths of at least part of the third sub-images in the second direction are the same, and each of the plurality of target sub-images includes a first sub-image, a second sub-image, and a third sub-image; wherein a width of the third sub-image in the second direction is larger than a width of the second sub-image in the second direction, which is larger than the width of the first sub-image in the second direction.

In some embodiment, the adjacent first sub-images at least partially overlap with each other in the second direction; the adjacent second sub-images at least partially overlap with each other in the second direction; and the third sub-images do not overlap with each other in the second direction.

In some embodiment, a ratio of the width of the second sub-region in the first direction to the width of the first sub-region in the first direction is 2:1; and a ratio of the widths of the third sub-image and the second sub-image in the second direction is 3:2, and a ratio of the widths of the second sub-image and the first sub-image in the second direction is 4:3.

In some embodiment, in the plurality of first sub-images arranged side by side in the second direction, the remaining first sub-images, except for a 1st first sub-image and a last first sub-image arranged side by side in the second direction, have a same width in the second direction; the 1st first sub-image and the last first sub-image have a same width in the second direction smaller than the width of the remaining first sub-image in the second direction; and a ratio of an overlapping width of two adjacent first sub-images in the second direction to the width of the remaining first sub-image in the second direction is 1:10; in the plurality of second sub-images arranged side by side in the second direction, the remaining second sub-images, except for the 1st second sub-image and the last second sub-image arranged side by side in the second direction, have the same width in the second direction; the 1st second sub-image and the last second sub-image have the same width in the second direction, which is smaller than the width of the remaining second sub-images in the second direction; and a ratio of an overlapping width of two adjacent second sub-images in the second direction to the width of the remaining second sub-images in the second direction is 1:10; in the plurality of third sub-images arranged side by side in the second direction, the remaining third sub-images, except for a 1st third sub-image and a last third sub-image arranged side by side in the second direction, have a same width in the second direction; the 1st third sub-image and the last third sub-image have a same width in the second direction smaller than the width of the remaining third sub-image in the second direction; a ratio of an overlapping width of two adjacent third sub-images in the second direction to the width of the remaining third sub-image in the second direction is 1:10; and a ratio of an overlapping width in the first direction of a first sub-image and a second sub-image adjacent to each other in the first direction to the width of the second sub-image in the first direction is 1:10, and a ratio of an overlapping width in the first direction of a third sub-image and a second sub-image adjacent to each other in the first direction to the width of the second sub-image in the first direction is 1:10.

In some embodiment, the target neural network model is trained by following steps: acquiring a first training data set and a second training data set, wherein the second training data set is obtained by filtering the first training data set; training a teacher machine learning model to be trained according to the first training data set to obtain a preliminarily trained teacher machine learning model; training the preliminarily trained teacher machine learning model according to the second training data set to obtain the trained teacher machine learning model; and training a student machine learning model to be trained by adopting a knowledge distillation training method according to the second training data set and the trained teacher machine learning model, to obtain the trained student machine learning model as the target neural network model.

In some embodiment, the second training data set includes a plurality of training images labeled with the sample labels; training the student machine learning model to be trained by adopting the knowledge distillation training method according to the second training data set and the trained teacher machine learning model, to obtain the trained student machine learning model as the target neural network model, includes: inputting the training image into the trained teacher machine learning model to obtain a first output result for the trained teacher machine learning model; inputting the training image into the student machine learning model to be trained to obtain a second output result for the student machine learning model to be trained; determining a first loss function according to the first output result and the second output result; determining a second loss value according to the second output result and the sample label of the training image; obtaining a weighted loss function according to the first loss function and the second loss function; and adjusting parameters of the student machine learning model to be trained according to the weighted loss function until the weighted loss function is converged, to obtain the trained student machine learning model as the target neural network model.

In some embodiment, acquiring the first training data set includes: acquiring an original data set, wherein the original data set comprises a plurality of initial sample images; performing a target object recognition on the initial sample image; and determining a first reference frame containing the target object in response to the target object being present; updating a position of the first reference frame according to position information of the first reference frame to obtain a second reference frame; determining an overlapping degree of the second reference frame and the first reference frame according to position information of the second reference frame and the position information of the first reference frame; and labeling a sample label for a partial sample image of the initial sample images in the second reference frame according to a comparison result between the overlapping degree and a first preset threshold, and taking the partial sample image labeled with the sample label as the training image in the first training data set.

In some embodiment, updating the position of the first reference frame according to the position information of the first reference frame to obtain the second reference frame, includes: moving a specific coordinate point in the first reference frame according to the position information of the first reference frame to obtain a third reference frame; adjusting a width and a height of the third reference frame based on a preset scaling factor according to position information of the third reference frame by taking a central point of the third reference frame as a center, to obtain a fourth reference frame; and determining a new central point according to position information of the fourth reference frame and first preset central point range; and adjusting a width and a height of the fourth reference frame according to the new central point and a preset cropping range to obtain the second reference frame.

In some embodiment, labeling the sample label for the partial sample image of the initial sample images in the second reference frame according to the comparison result between the overlapping degree and the first preset threshold, includes: in response to the overlapping degree being greater than or equal to the first preset threshold, generating a first preset range according to a first preset probability, generating a second preset range according to a second preset probability, generating a third preset range according to a third preset probability, and generating a fourth preset range according to a fourth preset probability; wherein the first preset probability is greater than the second preset probability, the second preset probability is greater than the third preset probability, and the third preset probability is greater than or equal to the fourth preset probability; a sum of the first preset probability, the second preset probability, the third preset probability and the fourth preset probability is 1; in response to the overlapping degree being within the first preset range, determining and labeling a partial sample image of the initial sample image in the second reference frame as a positive sample label, so that a ratio of a number of training images with the overlapping degree within the first preset range to a total number of training images with the positive sample labels in the first training data set is the first preset probability; in response to the overlapping degree being within the second preset range, determining and labeling a partial sample image of the initial sample image in the second reference frame as a positive sample label, so that a ratio of a number of training images with the overlapping degree within the second preset range to a total number of training images with the positive sample labels in the first training data set is the second preset probability; in response to the overlapping degree being within the third preset range, determining and labeling a partial sample image of the initial sample image in the second reference frame as a positive sample label, so that a ratio of a number of training images with the overlapping degree within the third preset range to a total number of training images with the positive sample labels in the first training data set is the third preset probability; and in response to the overlapping degree being within the fourth preset range, determining and labeling a partial sample image of the initial sample image in the second reference frame as a positive sample label, so that a ratio of a number of training images with the overlapping degree within the fourth preset range to a total number of training images with the positive sample labels in the first training data set is the fourth preset probability; wherein the overlapping degree in the first preset range is smaller than the overlapping degree in the second preset range, the overlapping degree in the second preset range is smaller than the overlapping degree in the third preset range, and the overlapping degree in the third preset range is smaller than the overlapping degree in the fourth preset range.

In some embodiment, in step of acquiring the first training data set, in response to no target object being present when performing the target object recognition on the initial sample image, the control method further includes: labeling the initial sample image with a negative sample label, and taking the initial sample image labeled with the negative sample label as a training image in the first training data set.

In some embodiment, after performing the target object recognition on the initial sample image; and determining a first reference frame containing the target object in response to the target object being present, the control method further includes: determining a target central point in the initial sample image according to a size of the initial sample image and the second preset central point range, and determining a fifth reference frame by taking the target central point as a center; determining an overlapping degree of the fifth reference frame and any first reference frame in the initial sample image according to position information of the fifth reference frame and the position information of the first reference frame; and labeling a partial sample image of the initial sample image in the fifth reference frame as a negative sample label in response that the overlapping degree of the fifth reference frame and any first reference frame in the initial sample image is smaller than or equal to a second preset threshold, and using the partial sample image labeled with the negative sample label as the training image.

In some embodiment, acquiring the image to be detected, includes: acquiring a plurality of continuous video frames shot by the shooting device; and determining whether a moving target exists in a shooting site of the shooting device by adopting a frame difference method according to the plurality of continuous video frames; and taking the video frame shot by the shooting device as the image to be detected in response to the moving target existing.

In a second aspect, an embodiment of the present disclosure further provides a control method for a broadcast monitoring system, wherein the broadcast monitoring system includes a computing and memory system and a terminal; the computing and memory system includes a processing module, a computing and memory module and an external storage module; and the control method includes: acquiring, by the processing module, an image to be detected, dividing the image to be detected into a plurality of target sub-images according to a shooting visual angle of a shooting device for shooting the image to be detected, and storing the plurality of target sub-images in the external storage module; reading, by the computing and memory module, the plurality of target sub-images, processing each of the plurality of target sub-images by using a pre-trained target neural network model to obtain a recognition result for the target sub-image, and storing the recognition result in the external storage module; obtaining, by the processing module, a detection result of whether a target object exists in the image to be detected or not based on the recognition result corresponding to each target sub-image, and sending the detection result to the terminal; and determining, by the terminal, a display state based on the detection result.

In some embodiment, the terminal includes a display module and a main control module; determining, by the terminal, the display state based on the detection result, includes: sending, by the main control module, an awakening request to the display module and resetting a sleep timer in response the detection result indicates that the target object exists in the image to be detected, to receive the detection result sent from the processing module in response to a terminal request; and sending, by the main control module, a sleep request to the display module to control the main control module to enter a sleep state in response that the detection result indicates that the target object does not exist in the image to be detected and a difference between a current system time and a latest awakening time of the display module is longer than a preset duration; and determining, by the display module, that the display state is normally displaying a picture shot by the shooting device in response to the awakening request; and determining, by the display module, that the display state is sleep in response to the sleep request.

In a third aspect, the embodiment of the present disclosure further provides a computing and memory system, including a processing module, a computing and memory module and an external storage module; wherein the processing module is configured to acquire an image to be detected; divide the image to be detected into a plurality of target sub-images according to a shooting visual angle of the shooting device for shooting the image to be detected, and store the plurality of target sub-images in the external storage module; the computing and memory module is configured to read the plurality of target sub-images; process each of the plurality of target sub-images by using a pre-trained target neural network model to obtain a recognition result for the target sub-image, and store the recognition result in the external storage module; and the processing module is configured to obtain a detection result of whether a target object exists in the image to be detected or not based on the recognition result corresponding to each target sub-image, and send the detection result to a terminal so that the terminal determines a display state based on the detection result.

In a fourth aspect, the embodiment of the present disclosure further provides a control apparatus for a broadcast monitoring system, including a computing and memory system and a terminal, wherein the computing and memory system includes a processing module, a computing and memory module and an external storage module; wherein the processing module is configured to acquire an image to be detected; divide the image to be detected into a plurality of target sub-images according to a shooting visual angle of the shooting device for shooting the image to be detected, and store the plurality of target sub-images in the external storage module; the computing and memory module is configured to read the plurality of target sub-images; process each of the plurality of target sub-images by using a pre-trained target neural network model to obtain a recognition result for the target sub-image, and store the recognition result in the external storage module; the processing module is configured to obtain a detection result of whether a target object exists in the image to be detected or not based on the recognition result corresponding to each target sub-image, and send the detection result to the terminal; and the terminal is configured to determine a display state based on the detection result.

In a fifth aspect, the embodiment of the present disclosure further provides a non-transitory computer readable storage medium, which has a computer program stored thereon, the computer program, when being executed by a processor, causes the processor to perform steps of the control method for a broadcast monitoring system in any one of the embodiments of the first aspect and/or steps of the control method for a broadcast monitoring system in any one of the embodiments of the second aspect.

DETAILED DESCRIPTION OF THE EXEMPLARY EMBODIMENTS

Figure 1:
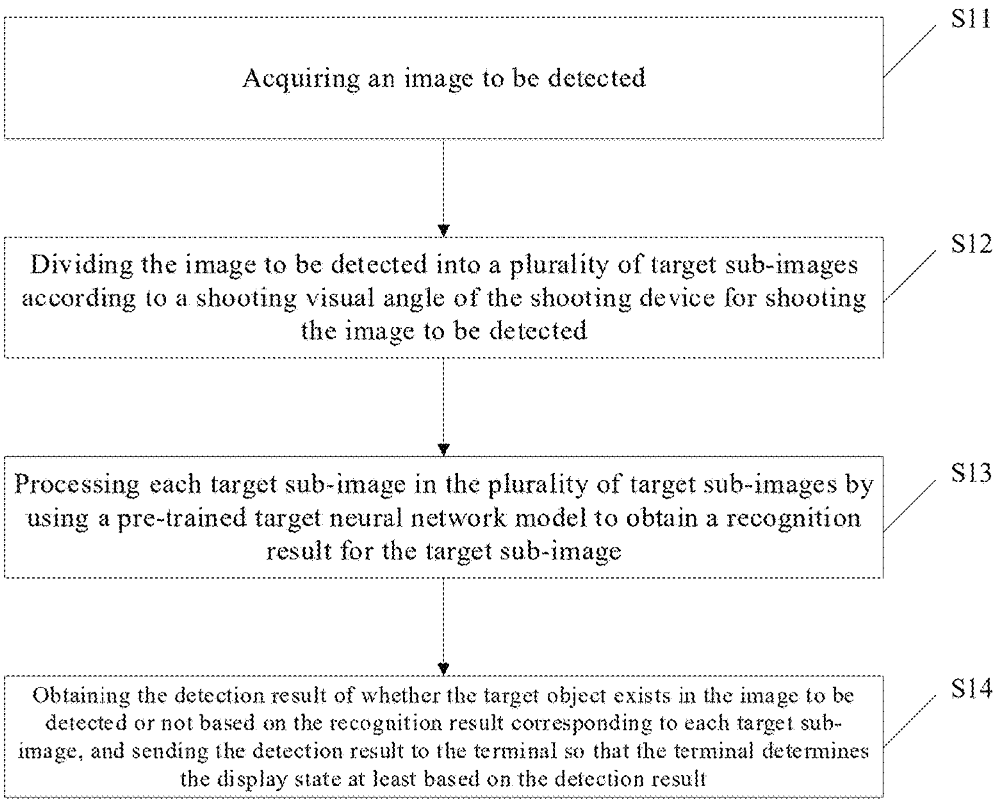
FIG. 1 is a flowchart of a control method for a broadcast monitoring system according to an embodiment of the present disclosure.

To make the objects, technical solutions and advantages of embodiments of the present disclosure more apparent, the technical solutions of the embodiments of the present disclosure will be described clearly and completely with reference to the drawings accompanying the embodiments of the present disclosure, and it is obvious that the described embodiments are only a part of embodiments of the present disclosure, not all embodiments of the present disclosure. Generally, the components of the embodiments of the present disclosure, as described and illustrated in the figures herein, could be arranged and designed in a wide variety of different configurations. Thus, the following detailed description of the embodiments of the present disclosure, provided in the accompanying drawings, is not intended to limit the scope of the present disclosure, as claimed, but is merely representative of selected embodiments of the present disclosure. All other embodiments, which can be derived by one of ordinary skill in the art from the embodiments of the present disclosure without making any inventive effort, shall fall within the protection scope of the present disclosure.

Unless defined otherwise, technical or scientific terms used herein shall have the ordinary meaning as understood by one of ordinary skill in the art to which this disclosure belongs. The use of “first”, “second”, and the like in this disclosure is not intended to indicate any order, quantity, or importance, but rather is used for distinguishing one element from another. Further, the use of the terms “a”, “an”, “the”, or the like does not denote a limitation of quantity, but rather denotes the presence of at least one. The word “include”, “comprise”, or the like, means that the element or item preceding the word contains the element or item listed after the word and its equivalent, but does not exclude the presence of other elements or items.

The phrase “a plurality of” or “multiple” or “several” used in this disclosure means two or more. The phrase “and/or” describes the association relationship of the associated objects, indicating that there may be three relationships; for example, A and/or B, which may indicates the following three cases: A exists alone, A and B both exist, and B exists alone. The character “/” generally indicates that the preceding and following associated objects are in an “or” relationship.

In the related art, with the intensive research and popularization for artificial intelligence algorithms represented by deep learning neural networks, an intelligent electronic device and its related application scenes are widely available, and the application scenes include face recognition, voice recognition, smart home, security monitoring, unmanned driving and the like. However, data storage and data processing are separated from each other due to the limitation from the classic von Neumann computer architecture, that is, the computing and storage functions are respectively realized by a central processing unit and a memory, and a performance difference between the central processing unit and the memory forms a “memory wall”, so that a large amount of energy is consumed in frequent transmission between a computing core and the memory. A computing and memory design can solve this problem at present. The computing and memory refers to combining the memory and the computing core more closely than in a traditional computer architecture, thereby reducing the overhead associated with the memory access and solving the “memory wall” problem. Three major factors of the artificial intelligence include a computility, data and an algorithm, and the computing and memory has the characteristics of the great computility, the low power consumption and the low time delay, so the computing and memory can play a great role in the future of the artificial intelligence. Current general computing and memory methods include a flash and a static random-access memory (SRAM). Generally, many national standards or industry standards associated with intelligent terminal products have standby power consumption requirements, such products have an intelligent awakening function, and supports standby awakening for 24 hours through voice, personnel detection or other mode, so that it is necessary to ensure that a whole detection system has lower standby power consumption to meet the corresponding energy efficiency standard.

In view of this, the embodiment of the present disclosure provides a control method for a broadcast monitoring system, specifically, including: acquiring an image to be detected; dividing the image to be detected into a plurality of target sub-images according to a shooting visual angle of a shooting device for shooting the image to be detected; processing each target sub-image in the plurality of target sub-images by using a pre-trained target neural network model to obtain a recognition result for the target sub-image; and obtaining a detection result indicating whether a target object exists in the image to be detected or not based on the recognition result corresponding to each target sub-image, and sending the detection result to a terminal so that the terminal determines a display state at least based on the detection result.

In the embodiment of the present disclosure, an image shot by a shooting device is detected by using a neural network, and a detection result is fed back to a terminal so that the terminal determines a current display state based on the detection result. For example, if no target object is detected for a long time, the terminal may enter a sleep state, thereby saving the system power consumption. If the detection result indicates in the sleep state of the terminal that a target object appears, the terminal may self-start and recover the normal display. In addition, in an intelligent awakening application scene in the embodiment of the present disclosure, while the system power consumption is saved, the image to be detected shot by the shooting device is reasonably divided into a plurality of target sub-images according to a shooting visual angle in combination with the neural network image recognition technology, the target sub-images are respectively recognized, and recognition results for the target sub-images are integrated to obtain the detection result, thereby improving the recognition precision for the target object in the image to be detected, and therefore controlling the awakening time for the terminal more accurately. In addition, a computing and memory module, which is a system architecture integrated with the computing and storage functions, is utilized to support the complex data calculation in the neural network, so that the energy loss in a data carrying process is greatly avoided, and the system power consumption is reduced.

For convenience of understanding, first, the control method for a broadcast monitoring system provided in an embodiment of the present disclosure will be described in detail. An execution main body of the control method for a broadcast monitoring system may be a computing and memory system with a computation capability, including a processing module, a computing and memory module, and an external storage module. The processing module is, for example, a main processor CPU in the computing and memory system, the computing and memory module may be, for example, a storage and computing core integrated with the flash or the SRAM, and the external storage module may be, for example, an external storage module DRAM, so that the faster response speed is achieved, and the power consumption of the broadcast monitoring system is reduced. The computing and memory system may be a part of the broadcast monitoring system. Meanwhile, the lightweight target neural network model designed in the present disclosure is migrated into the computing and memory module, and the computing and memory mode with a low power consumption may help the target neural network realize inference, so that the awakening service for the intelligent terminal is completed, the power consumption is reduced, and the faster response speed is achieved.

FIG. 1 is a flowchart of a control method for a broadcast monitoring system according to an embodiment of the present disclosure. As shown in FIG. 1, the method includes steps S11 to S14.

The step S11 includes acquiring an image to be detected.

In this step, the image to be detected is an image to be detected which is shot by a shooting device to detect whether a target object exists. This step S11 may be, for example, executed by a processing module in the computing and memory system. In one case, the image to be detected is an image shot by the shooting device in real time. In another case, the image to be detected may be an image which is screened out by the processing module from images shot by the shooting device in real time and in which the target object may be more likely present. The screening method may adopt a frame difference method or other technical scheme, which is not particularly limited in the embodiment of the present disclosure.

The shooting device may be, for example, a device having a picture collecting function such as a camera. The shooting device collects images in a shooting site in real time where the target object, such as personnel flow, exists possibly, not in real time.

The acquired image to be detected may be then stored in an external storage module for calling in a subsequent process of dividing images.

The step S12 includes dividing the image to be detected into a plurality of target sub-images according to a shooting visual angle of the shooting device for shooting the image to be detected.

This step S12 may be, for example, executed by the processing module in the computing and memory system. The processing module reads the image to be detected from the external storage module, divides the image to be detected into the plurality of target sub-images according to the shooting visual angle of the shooting device for shooting the image to be detected, and stores the divided target sub-images into the external storage module for subsequent calling to a target neural network model for processing.

A display state of the terminal (including a display screen) in the intelligent awakening application scene is determined according to the detection result, so that if a confidence of the detection result is low, the terminal may mistakenly enter the sleep state, and therefore a user cannot accurately monitor the on-site picture in the shooting site. Therefore, it is necessary to improve the accuracy of the detection result while saving the system power consumption. Based on this, in the embodiment of the present disclosure, the processing module divides the image to be detected into the plurality of target sub-images according to the shooting visual angle of the shooting device. The image recognition accuracy can be improved by refining the image to be detected and processing each refined target sub-image through a target neural network model trained in advance subsequently.

It should be noted that the higher the refinement degree for the image to be detected is, that is, for one image to be detected, the more the number of the divided target sub-images is, the more accurate the detection result obtained by combining the recognition results for the target sub-images obtained after the processing by the target neural network model is. However, the higher the degree of refinement of the image to be detected, the more subsequent model inference processes are required, which increases the system power consumption. Based on this, in the embodiment of the present disclosure, the image to be detected is reasonably divided according to the shooting visual angle of the shooting device, which can ensure the image recognition precision, avoids a large amount of image detection due to reasonably dividing the image to be detected, and reduces the system power consumption.

For example, a variety of shooting visual angles are set in advance for the shooting device, such as a normal visual angle, a close shot (having a visual angle smaller than the normal shooting visual angle), a medium shot (having a visual angle larger than the normal visual angle), a long shot (having a visual angle larger than that of the medium shot), and the like. The image dividing modes are different for different shooting visual angles. For example, the refinement degree for the image to be detected corresponding to the long shot is greater than the refinement degree for the image to be detected corresponding to the medium shot, the refinement degree for the image to be detected corresponding to the medium shot is greater than the refinement degree for the image to be detected corresponding to the normal visual angle, and the refinement degree for the image to be detected corresponding to the normal visual angle is greater than the refinement degree for the image to be detected corresponding to the close shot.

The step S13 includes processing each of the plurality of target sub-images by using a pre-trained target neural network model to obtain a recognition result for the target sub-image.

This step S13 may be, for example, executed by the computing and memory module in the computing and memory system. A target neural network model is integrated in the computing and memory module. The computing and memory module reads the target sub-images from the external storage module, processes any one of the target sub-images by using the pre-trained target neural network model to obtain the recognition result for the target sub-image, and stores the recognition result for the target sub-image into the external storage module.

Specifically, the target sub-image is input into the target neural network model, and a feature extraction and analysis process is performed on the target sub-image by using a plurality of network layers, so as to determine whether the target object exists. In the feature extraction and analysis process on the target sub-image, the operation and output of different network layers are processed by adopting a storage and computing core (flash or SRAM) architecture. For example, for one convolution layer in a convolution neural network, in a convolution operation process, a multi-channel intermediate result corresponding to the internal convolution downsampling process is cached until a convolution output result of one target sub-image is output, the convolution output result may be used as the input of another convolution layer. The process is sequentially executed for each convolution layer in this way until the target neural network model outputs the recognition result for the target sub-image.

The intermediate result for the internal convolution is cached by adopting the computing and memory mode for calling by the next convolution layer, so that compared with a system architecture with a memory wall in the prior art, the energy loss caused in the data carrying process is avoided, the operation efficiency is improved, the system power consumption is reduced, and the method has a higher application prospect for the portable device.

The target neural network model may employ a lightweight classification model, and a result recognized by the lightweight classification model is that the target object may or may not exist. Here, the target object may be, for example, a person or a physical object.

The step S14 includes obtaining the detection result of whether the target object exists in the image to be detected or not based on the recognition result corresponding to each target sub-image, and sending the detection result to the terminal so that the terminal determines the display state at least based on the detection result.

This step S14 may be, for example, executed by the processing module in the computing and memory system. The processing module acquires the recognition result of each target sub-image divided from the image to be detected from the external storage module, obtains the detection result of whether the target object exists in the image to be detected or not based on the recognition result corresponding to each target sub-image, and sends the detection result to the terminal.

For example, the processing module may obtain the detection result, which is the "target object exists", based on the recognition result corresponding to each target sub-image in a case where any one recognition result indicates that the target object exists.

For example, the processing module may obtain the detection result, which is the "target object exists", based on the recognition result corresponding to each target sub-image in a case where a proportion of multiple recognition results indicating that the target object exists to all the recognition results exceeds a set value.

The processing module sends the detection result to the terminal, and a main control module in the terminal may determine the display state at least based on the detection result, and the display screen in the terminal may determine whether to display a picture normally or to go to sleep based on the currently determined display state.

In the control method for a broadcast monitoring system, the data processing is realized by adopting the computing and memory system, so that the energy loss caused in the data carrying process is avoided, the calculation efficiency is improved, and the system power consumption is reduced. According to the image to be detected shot by the shooting device, the image to be detected is reasonably divided into the plurality of target sub-images according to the shooting visual angle, and by combining the lightweight target neural network model, whether the target object exists in the image to be detected is recognized with high precision, so that a more accurate display state is determined. When the display screen enters the sleep state, the system power consumption is saved, and the display screen may be kept in a standby state for a long time under the condition that the terminal is not actively awakened, so that the problem of high power consumption is solved, and a large amount of maintenance cost is reduced.

In some embodiments, if the whole image to be detected is input into the model for classification and recognition, the target objects are not concentrated, which may result in inaccurate recognition result. Therefore, in order to improve the accuracy of model recognition, for step S12, the image to be detected may be reasonably divided according to the shooting visual angle of the shooting device, specifically:

Under the condition that the shooting visual angle is within a preset visual angle range, the image to be detected is divided into a first sub-region 01, a second sub-region 02 and a third sub-region 03 which are arranged side by side along a first direction Y, wherein each of the first sub-region 01 and the third sub-region 03 partially overlaps with the second sub-region 02, a width of the first sub-region 01 in the first direction Y is equal to a width of the third sub-region 03 in the first direction Y, and a width of the second sub-region 02 in the first direction Y is greater than the width of the first sub-region 01 in the first direction Y, the first direction Y is a height direction of the image to be detected. A part of the image to be detected in the first sub-region 01 is divided into a plurality of first sub-images 011 arranged side by side along a second direction X, wherein widths of at least part of the first sub-images 011 in the second direction X are the same, the second direction X is a width direction of the image to be detected. A part of the image to be detected in the second sub-region 02 is divided into a plurality of second sub-images 012 arranged side by side along the second direction X, wherein widths of at least part of the second sub-images 012 in the second direction X are the same. A part of the image to be detected in the third sub-region 03 is divided into a plurality of third sub-images 013 arranged side by side along the second direction X, wherein widths of at least part of the third sub-images 013 in the second direction X are the same. The target sub-image includes a first sub-image 011, a second sub-image 012, and a third sub-image 013; a width of the third sub-image 013 in the second direction X is larger than a width of the second sub-image 012 in the second direction X, the width of the second sub-image 012 in the second direction X is larger than a width of the first sub-image 011 in the second direction X.

Figure 2:
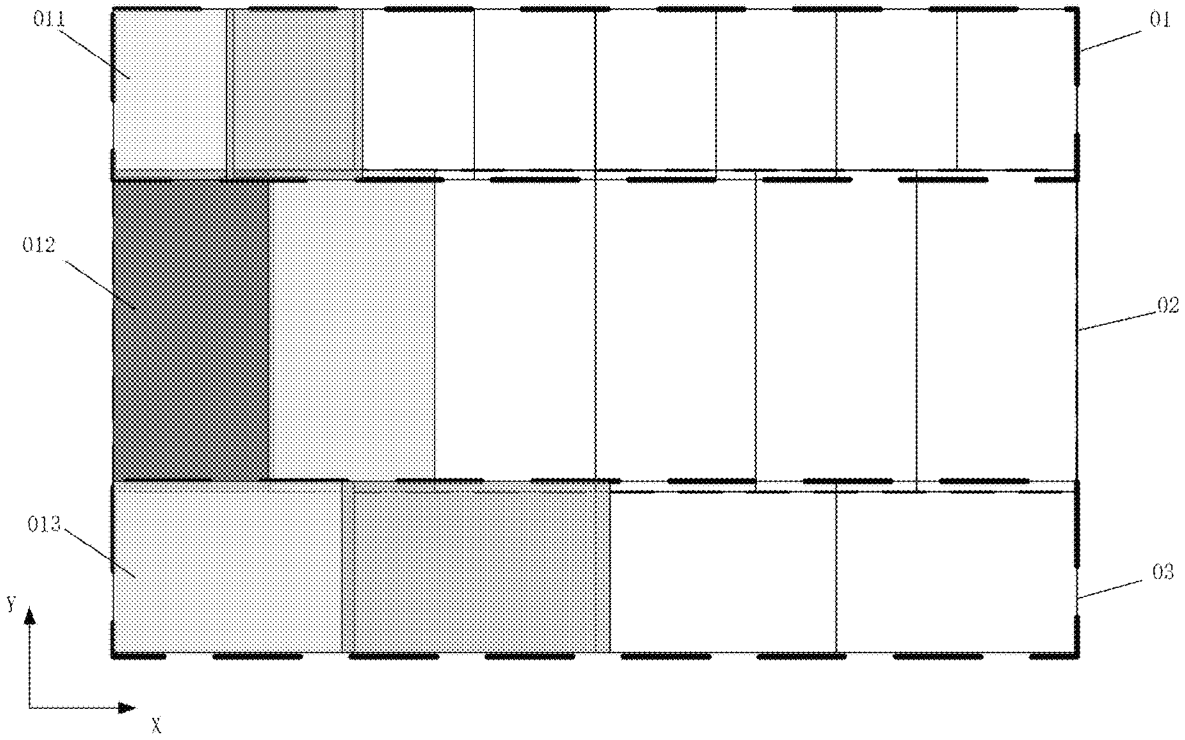
FIG. 2 is a schematic diagram illustrating an effect of reasonably dividing an image to be detected according to an embodiment of the present disclosure.

In this embodiment, the preset visual angle range may be set according to actual conditions. FIG. 2 is a schematic diagram illustrating an effect of reasonably dividing an image to be detected according to an embodiment of the present disclosure. As shown in FIG. 2, for example, the preset visual angle range is a range where the normal visual angle is located. The image to be detected is divided into three regions, specifically, the first sub-region 01, the second sub-region 02 and the third sub-region 03 which are arranged side by side along the first direction Y and are respectively positioned at the upper, middle and lower positions of the image to be detected on the front side. The second sub-region 02 is located between the first sub-region 01 and the third sub-region 03, and the first sub-region 01, the second sub-region 02 and the third sub-region 03 are deployed at corresponding positions sequentially away from the camera. For example, the width of the first sub-region 01 in the first direction Y is equal to the width of the third sub-region 03 in the first direction Y, and the width of the second sub-region 02 in the first direction Y is greater than the width of the first sub-region 01 in the first direction Y The first sub-region 01, the second sub-region 02 and the third sub-region 03 have equal widths in the second direction X. The second direction X is the width direction of the image to be detected.

As shown in FIG. 2, in the practical application scenes, the closer a person is to the camera, the larger a picture region occupied by a shape of the person; the farther away the person is from the camera, the smaller the picture region occupied by the shape of the person. Therefore, the number of the plurality of first sub-images 011 in the first sub-region 01 is greater than the number of the plurality of second sub-images 012 in the second sub-region 02, the number of the plurality of second sub-images 012 in the second sub-region 02 is greater than the number of the plurality of third sub-images 013 in the third sub-region 03. For example, the width of the third sub-image 013 in the second direction X is greater than the width of the second sub-image 012 in the second direction X, the width of the second sub-image 012 in the second direction X is greater than a width of the first sub-image 011 in the second direction X. At least some of the first sub-images 011 in the second direction X have the same width. For example, in the plurality of first sub-images 011 arranged side by side in the second direction X, the remaining first sub-images 011, except for a 1st first sub-image 011 and a last first sub-image 011 arranged side by side in the second direction X, have the same width in the second direction X; the 1st first sub-image 011 and the last first sub-image 011 have the same width in the second direction X. At least some of the second sub-images 012 have the same width in the second direction X. For example, in the plurality of second sub-images 012 arranged side by side in the second direction X, the remaining second sub-images 012, except for a 1st second sub-image 012 and a last second sub-image 012 arranged side by side in the second direction X, have the same width in the second direction X; the 1st second sub-image 012 and the last second sub-image 012 have the same width in the second direction X. At least some of the third sub-images 013 have the same width in the second direction X. For example, the widths of the third sub-images 013 in the second direction X are all the same.

Further, for a position relatively far away from the camera in the deployment scene (for example, a position corresponding to the first sub-image 011 and a position corresponding to the second sub-image 012), the adjacent first sub-images 011 at least partially overlap with each other in the second direction X; the adjacent second sub-images 012 at least partially overlap with each other in the second direction X, so that the problem of inaccurate recognition at a position where adjacent target sub-images are spliced is further solved, and the recognition precision of the target sub-images is improved. For a position relatively close to the camera in the deployment scene (for example, a position corresponding to the third sub-image 013), in order to simplify the image dividing manner, the third sub-images 013 may be set to not overlap with each other in the second direction X. The target object at the position close to the camera occupies a larger proportion of the screen than the target object at the position away from the camera, so that the adjacent third sub-images 013 do not overlap with each other in the second direction X, which does not or nearly not affect the recognition accuracy for the third sub-images 013, or the effect is negligible.

Further, a ratio of the width of the second sub-region 02 to the width of the first sub-region 01 in the first direction Y is 2:1; a ratio of the widths of the third sub-image 013 to the second sub-image 012 in the second direction X is 3:2, and a ratio of the widths of the second sub-image 012 to the first sub-image 011 in the second direction X is 4:3.

Alternatively, for different application scenes and different sizes of the picture acquired by the camera, different sub-regions may be divided, and different width ratios may be set, which is not specifically limited by the present disclosure.

Further, in the plurality of first sub-images 011 arranged side by side in the second direction X, the remaining first sub-images 011, except for the 1st first sub-image 011 and the last first sub-image 011 arranged side by side in the second direction X, have the same width in the second direction X; the 1st first sub-image 011 and the last first sub-image 011 have the same width in the second direction X, which is smaller than the width of the remaining first sub-images 011 in the second direction X; a ratio of an overlapping width of two adjacent first sub-images 011 in the second direction X to the width of the remaining first sub-image 011 in the second direction X is 1:10. In the plurality of second sub-images 012 arranged side by side in the second direction X, the remaining second sub-images 012, except for the 1st second sub-image 012 and the last second sub-image 012 arranged side by side in the second direction X, have the same width in the second direction X; the 1st second sub-image 012 and the last second sub-image 012 have the same width in the second direction X, which is smaller than the width of the remaining second sub-image 012 in the second direction X; a ratio of an overlapping width of two adjacent second sub-images 012 in the second direction X to the width of the remaining second sub-image 012 in the second direction X is 1:10. In the plurality of third sub-images 013 arranged side by side in the second direction X, the remaining third sub-images 013, except for the 1st third sub-image 013 and the last third sub-image 013 arranged side by side in the second direction X, have the same width in the second direction X; the 1st third sub-image 013 and the last third sub-image 013 have the same width in the second direction X, which is smaller than the width of the remaining third sub-image 013 in the second direction X; a ratio of an overlapping width of two adjacent third sub-images 013 in the second direction X to the width of the remaining third sub-image 013 in the second direction X is 1:10. A ratio of an overlapping width in the first direction Y of a first sub-image 011 and a second sub-image 012 adjacent to each other in the first direction Y to the width of the second sub-image 012 in the first direction Y is 1:10. A ratio of an overlapping width in the first direction Y of a third sub-image 013 and a second sub-image 012 adjacent to each other in the first direction Y to the width of the second sub-image 012 in the first direction Y is 1:10.

With the above embodiments, in the normal visual angle, the image to be detected is divided into the plurality of target sub-images in the above dividing manner, specifically including the plurality of first sub-images 011, the plurality of second sub-images 012, and the plurality of third sub-images 013, which refines the image to be detected. The accuracy of subsequent detection results is improved on the premise that the system power consumption is controlled within a reasonable range.

In some embodiments, with respect to the step S11, the frame difference method is used to detect whether a moving target exists in the shooting scene of the shooting device, and the moving target may be a moving physical object or person. Specifically, the processing module acquires a plurality of continuous video frames shot by the shooting device; and determines whether the moving target exists in the shooting site of the shooting device by adopting the frame difference method according to the plurality of continuous video frames, and stores a determining result into the external storage module. For example, if there is the moving target in the shooting scene, the image of the target are located at different positions in different video frames. A pixel value difference operation is performed on two or three video frames continuous in time by using a frame difference algorithm, and a subtraction operation is performed on pixel values corresponding to different frames to determine an absolute value of a gray value. When the absolute value exceeds a threshold, it may be determined that the moving target exists. If the moving target exists, the video frame shot by the shooting device is taken as the image to be detected.

In the embodiment, before the detection is performed by using the model, the video frames are preliminarily screened by adopting the frame difference method, to find the video frames to be detected in which the target object exists in a high probability, so that the subsequent model processing amount is simplified, and the detection efficiency is improved.

Figure 3:
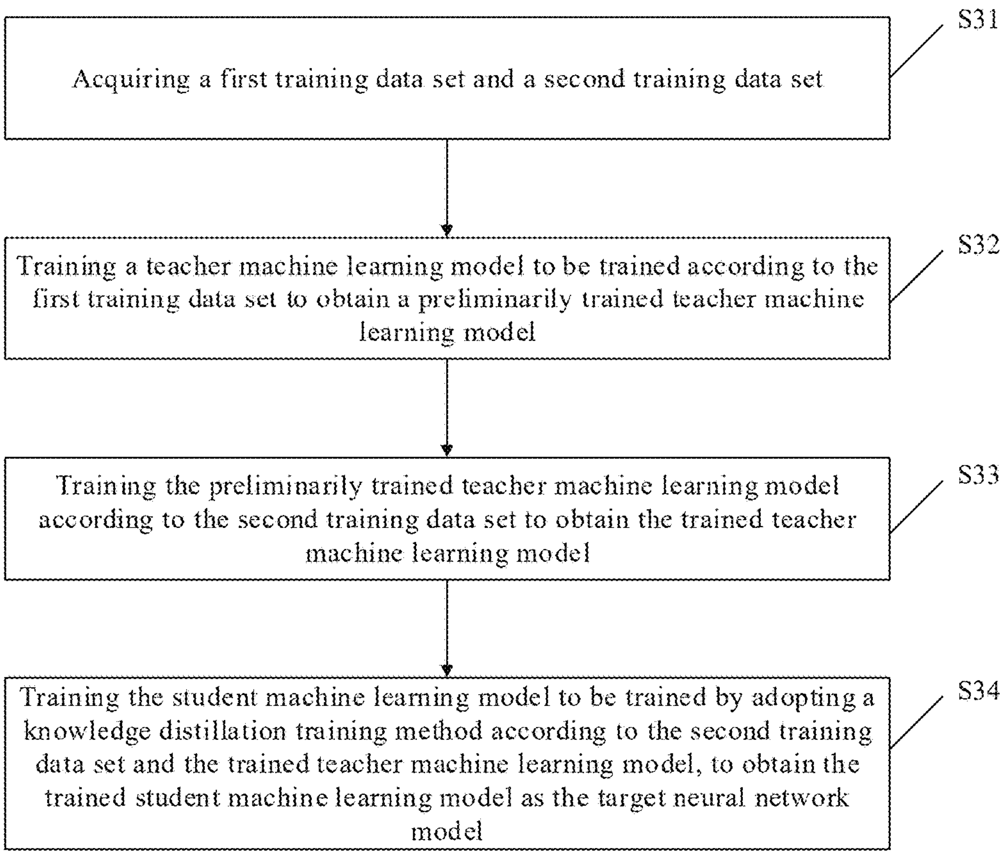
FIG. 3 is a schematic diagram illustrating a training process for an exemplary target neural network model according to an embodiment of the present disclosure.

FIG. 3 is a schematic diagram illustrating a training process for an exemplary target neural network model according to an embodiment of the present disclosure. In some embodiments, as shown in FIG. 3, the processing module includes a training process executing steps S31 to S34.

The step S31 includes acquiring a first training data set and a second training data set.

Here, the first training data set may be a labeled public data set and/or collected video data. Alternatively, the first training data set may be a data set obtained by further enriching the sample types based on the labeled public data set and/or the collected video data, so that the obtained training images are more diverse. The manner of enriching the sample types may refer to the following steps S311 to S315, and the detailed process is not described herein. The first training data set includes a plurality of training images, and each of the training images includes a corresponding sample label.

It should be noted that in order to improve the model training precision, it is necessary to provide a large amount of sample data for supporting this, but the sample is not easily formed, therefore in order to obtain a large amount of samples in the early stage, the first training data set with noise (i.e., the noisy first training data set) is acquired as a training set of a teacher machine learning model in the embodiment.

Here, the second training data set may be obtained by filtering the first training data set, i.e., the second training data set is a noiseless data set (i.e., a data set without noise) that is accurately classified by refining. The second training data set includes a partial sample image of the training images in the first training data set. The second training data set includes a plurality of training images, and each of the training images includes a corresponding sample label.

In some embodiments, the first training data set includes training images with noise. For example, positive samples are preset as images with human head features, and negative samples are preset as images without human head features (such as images without human features at all, and images with some human limb features rather than the head features). The training images in the first training data set meet the characteristics of the target object existing, and are labeled as positive sample labels; the training images in the first training data set meet the characteristics of the target object not existing, and are labeled as negative sample labels. For example, the human features are present in a training image in the first training data set, and therefore the training image is labeled as a positive sample image. The head features are not present in a training image, and therefore the training image is noisy.

An artificial screening method may be selected to screen out the accurately classified training images from the noisy first training data set as the samples in the second training data set. For example, a training image including a feature of a head above a shoulder of a pedestrian is used as the positive sample in the second training data set, and a training image including other limb features except the head feature of the pedestrian is used as the negative sample in the second training data set. Alternatively, a traditional image recognition technology may be adopted to detect whether a training image in the first training data set has the feature above the shoulder such as the head feature of the pedestrian, and if so, the training image is screened out as the positive sample in the second training data set; and if not, the training image is screened out as the negative sample in the second training data set.

The step S32 includes training a teacher machine learning model to be trained according to the first training data set to obtain a preliminarily trained teacher machine learning model.

For example, a training image A in the first training data set is input into the teacher machine learning model to be trained, to obtain an output result A corresponding to the training image A, where the output result A is a result indicating whether the training image A has a target object. If a sample label of the training image A indicates that the target object exists, a third loss function is determined according to the output result A and the sample label of the training image A; and the process is repeated to sequentially traverse the training images in the first training data set and determine the third loss function so as to continuously train the teacher machine learning model to be trained, and finally obtain the preliminarily trained teacher machine learning model.

The step S33 includes training the preliminarily trained teacher machine learning model according to the second training data set to obtain the trained teacher machine learning model.

For example, a training image B in the second training data set is input into the preliminarily trained teacher machine learning model, to obtain an output result B corresponding to the training image B, where the output result B is a result indicating whether the training image B has a target object. If a sample label of the training image B indicates that the target object exists, a fourth loss function is determined according to the output result B and the sample label of the training image B; and the process is repeated to sequentially traverse the training images in the second training data set and determine the fourth loss function, so as to continuously train the preliminarily trained teacher machine learning model, and finally obtain the trained teacher machine learning model.

The step S34 includes training the student machine learning model to be trained by adopting a knowledge distillation training method according to the second training data set and the trained teacher machine learning model, to obtain the trained student machine learning model as the target neural network model.

Here, the trained teacher machine learning model is a teacher model in the knowledge distillation process; and the student machine learning model to be trained is a student model in the knowledge distillation process.

Figure 4:
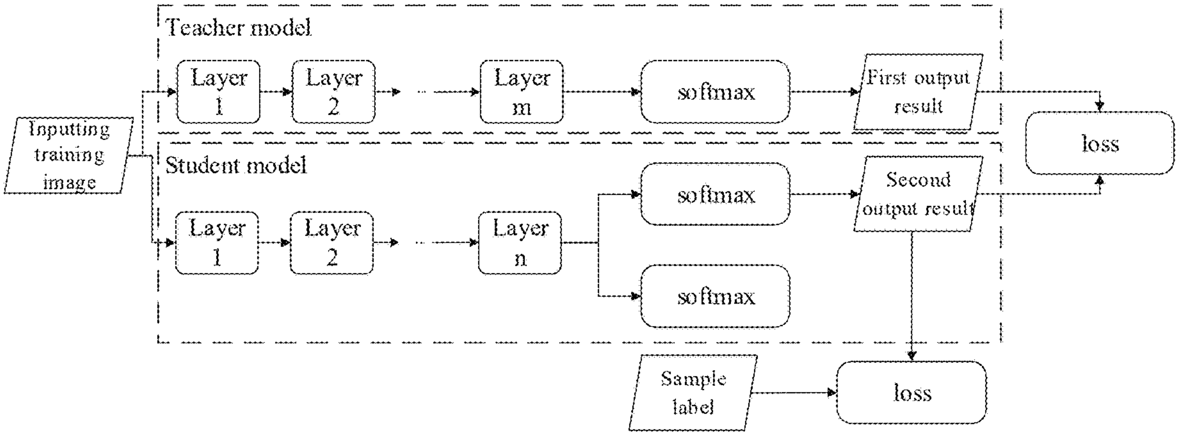
FIG. 4 is a schematic diagram of a network architecture of an exemplary knowledge distillation according to an embodiment of the present disclosure.

FIG. 4 is a schematic diagram of a network architecture of an exemplary knowledge distillation according to an embodiment of the present disclosure. As shown in FIG. 4, the network architecture includes a teacher model and a student model, where the teacher model includes m network layers; and the student model includes n network layers. Here, the teacher model and the student model may be a homogeneous network or a heterogeneous network.

The process of training the student model is also to train the teacher model by using the hard labels in the second training data set (i.e., the sample labels carried by the training images), and then determine a loss function of the student model by using soft labels obtained in the teacher model (i.e., the soft labels are output by a softmax layer in the teacher model) in combination with the hard labels in the second training data set.

As shown in FIG. 4, an output result from an $m^{th}$ network layer of the teacher model is processed by the softmax layer to obtain a first output result; and an output result from an $n^{th}$ network layer of the student model is processed by softmax layers to obtain a second output result. A loss function loss is formed according to the first output result, the second output result and the sample labels.

In the embodiment, the larger teacher model is converted into the smaller student model by using the knowledge distillation method, the performances close to those of the teacher model are retained, thereby solving the problem that hardware of the target neural network model deployed at an edge is insufficient.

In some embodiments, since the intelligent awakening application scenes in the present disclosure is limited by a hardware of a computing and memory chip, the lightweight target neural network model needs to be designed to complete the target detection task. An architecture of the target neural network model is the network architecture of the student model.

Figure 5:
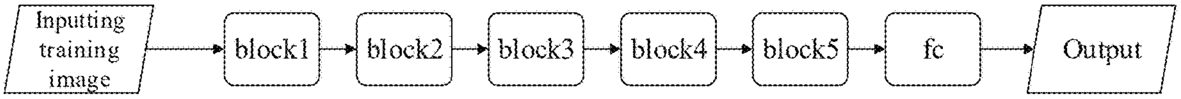
FIG. 5 is a schematic diagram of a network architecture of an exemplary student model according to an embodiment of the present disclosure.

FIG. 5 is a schematic diagram of a network architecture of an exemplary student model according to an embodiment of the present disclosure. As shown in FIG. 5, the network architecture includes five convolution units (blocks) and one full-connected layer fc; and each convolution unit (block) includes two convolution layers. For example, among two convolution layers in each of a first convolution unit block1, a second convolution unit block2, and a third convolution unit block3, for the previous convolution layer (which is firstly subjected to the data processing), a convolution kernel with a size of 3×3 is used for convolution, with a convolution step of 2 and a padding value of 1; and for the subsequent convolution layer (which receives data output by the previous convolution layer), a convolution kernel with a size of 3×3 is used for convolution, with a convolution step of 1 and a padding value of 1. Among two convolution layers in each of a fourth convolution unit block4 and a fifth convolution unit block5, for the previous convolution layer (which is firstly subjected to the data processing) a convolution kernel with a size of 5×5 is used for convolution, with a convolution step of 2 and a padding value of 1; and for the subsequent convolution layer (which receives data output by the previous convolution layer) a convolution kernel with a size of 3×3 is used for convolution, with a convolution step of 1 and a padding value of 1.

The target neural network model meets the lightweight requirement, is migrated to the computing and memory chip, and has the faster response speed and the lower power consumption in the application process.

In some embodiments, the second training data set includes a plurality of training images labeled with the sample labels.

As shown in FIG. 4, the step S34, that is, the specific process of obtaining the target neural network model by training, includes the steps S341 to S346.

The step S341 includes inputting the training image into the trained teacher machine learning model to obtain a first output result for the trained teacher machine learning model.

For example, the training image B in the second training data set is input into the teacher machine learning model to be trained, to obtain a first output result corresponding to the training image B, where the first output result is a result which is output by the teacher machine learning model to be trained and indicates whether the training image B has the target object.

The step S342 includes inputting the training image into the student machine learning model to be trained to obtain a second output result for the student machine learning model to be trained.

Continuing the above example, the training image B in the second training data set is input into the student machine learning model to be trained, to obtain a second output result corresponding to the training image B, where the second output result is a result which is output by the student machine learning model to be trained and indicates whether the training image B has the target object.

The step S343 includes determining a first loss function according to the first output result and the second output result.

After the steps S341 and S342, the first loss function may be determined by using a KLD loss function algorithm (i.e., KLDloss) according to a mean square error between the first output result and the second output result or according to the first output result and the second output result.

The step S344 includes determining a second loss value according to the second output result and the sample label of the training image.

The second loss function may be determined according to an overlapping degree of the second output result (i.e., a predicted label of the training image B predicted by the student machine learning model to be trained) and the sample label of the training image (i.e., the real hard label).

The step S345 includes obtaining a weighted loss function according to the first loss function and the second loss function.

The first loss function and the second loss function are weighted according to a preset weight to obtain the weighted loss function. Here, the preset weight may be determined empirically, which is not particularly limited in the embodiment of the present disclosure.

Ratio coefficients of the first loss function and the second loss function are acquired. In this embodiment, since the weighted loss function is composed of the first loss function and the second loss function, when one of the ratio coefficients (α) is determined, the other ratio coefficient (i.e., 1−α) may be determined. Then, the first loss function L1 and the second loss function L2 are weighted and summed according to the ratio coefficients, and the weighted loss function is determined. The weighted loss function L, in conjunction with the above description, may be specifically expressed as: $L=\alpha\times L1+(1-\alpha)\times L2$.

The step S346 includes adjusting parameters of the student machine learning model to be trained according to a weighted loss function until the weighted loss function is converged, to obtain the trained student machine learning model as the target neural network model.

In some embodiments, the first training data set may be a data set obtained by further enriching the sample categories based on an original data set. The specific process includes generating diversified training images, specifically including steps S311 to S317.

The step S311 includes acquiring an original data set.

The original data set includes a plurality of initial sample images.

For example, the original data set may be a labeled public data set and/or collected video data. Here, the "labeled" refers to a first reference frame for labeling a target object existing in an initial sample image.

The initial sample images in the original data set may or may not have a target object. No first reference frame or position information of the first reference frame is empty in those initial sample images without the target object (which means that there is no feature of the target object at all).

The step S312 includes recognizing a target object in the initial sample image. If the target object is present, step S313 is executed, and if the target object is not present, step S317 is executed.

For example, the target object recognition may be performed on the initial sample image by using a target detection network (retinaface) or a neural network (yolov5) or other model.

Here, the initial sample image without the target object is the initial sample image without the features of the target object at all, and those initial sample image is labeled with the negative sample label, and the initial sample image labeled with the negative sample label serves as a negative sample (training image) in the first training data set.

It should be noted that for the initial sample image in which the target object exists, the method includes the following steps S313 to S316.

The step S313 includes determining a first reference frame containing the target object.

In the case that it is determined that the target object exists in the initial sample image, the first reference frame is labeled for a region where the target object is located, so that the target object is shown in the first reference frame. The position information of the first reference frame indicates a position of the target object in the initial sample image.

The step S314 includes updating a position of the first reference frame according to the position information of the first reference frame to obtain a second reference frame.

The specific updating method may include: at least one of randomly moving a specific coordinate point, randomly scaling, randomly cropping, and the like.

Example 1, a specific process for randomly moving a detection point includes: coordinates of a specific coordinate point preset in the first reference frame may be randomly moved according to the position information of the first reference frame (i.e., position coordinates of the first reference frame in the initial sample image), to obtain a new contour coordinate point, so that the second reference frame may be formed.

Example 2, a specific process for randomly scaling includes: coordinates of a central point of the first reference frame are kept unchanged, and a width and a height of the first reference frame are randomly scaled according to the position information of the first reference frame (i.e., the position coordinates of the first reference frame in the initial sample image), to obtain a new contour coordinate point, so that the second reference frame is formed.

Example 3, a specific process for randomly cropping includes: a new central point may be determined according to the position information of the first reference frame (i.e., the position coordinates the first reference frame in the initial sample image) and a first preset central point range; coordinates of the new central point are kept unchanged, and the width and the height of the first reference frame are randomly adjusted according to a preset cropping range to obtain a new contour coordinate point, so that the second reference frame is formed.

In other embodiments, the position of the first reference frame is updated in combination with the above examples. For example, the processes in the examples 1 and 2 are performed sequentially, specifically: the coordinates of a specific coordinate point preset in the first reference frame are randomly moved according to the position information of the first reference frame, to obtain a new contour coordinate point, and a transition frame is formed; and coordinates of a central point of the transition frame are kept unchanged according to position information of the transition frame, and a width and a height of the transition frame are randomly scaled to obtain a new contour coordinate point, and the second reference frame is formed. As another example, the processes in the examples 1 and 3 are performed sequentially, specifically: the coordinates of a specific coordinate point preset in the first reference frame are randomly moved according to the position information of the first reference frame, to obtain a new contour coordinate point, and a transition frame is formed; a new central point is determined according to position information of the transition frame and a preset central point range; and coordinates of the new central point is kept unchanged, and a width and a height of the transition frame are randomly adjusted according to a preset cropping range to obtain a new contour coordinate point, and the second reference frame is formed. As another example, the processes in the examples 2 and 3 are performed sequentially, specifically: the coordinates of the central point of the first reference frame are kept unchanged according to the position information of the first reference frame, a width and a height of the first reference frame are randomly scaled to obtain a new contour coordinate point, and a transition frame is formed; a new central point is determined according to position information of the transition frame and a preset central point range; and coordinates of the new central point are kept unchanged, and a width and a height of the transition frame are randomly adjusted according to a preset cropping range to obtain a new contour coordinate point, and the second reference frame is formed.

In other embodiments, the position of the first reference frame may be updated by combining all the above examples (the example 1, the example 2, and the example 3), which includes steps S314-1 to S314-3.

The step S314-1 includes moving a specific coordinate point in the first reference frame according to the position information of the first reference frame to obtain a third reference frame.

Here, the specific coordinate point may be a preset vertex of an outer contour of the first reference frame, such as a vertex 1 in the upper left corner, a vertex 2 in the upper right corner, a vertex 3 in the lower left corner, or a vertex 4 in the lower right corner. In the embodiment, the vertex 1 in the upper left corner or the vertex 4 in the lower right corner may be selected as the specific coordinate points for updating the diversified reference frames.

For example, the vertex 1 in the upper left corner has coordinates ($lt_x$, $lt_y$), and the vertex 4 in the lower right corner has coordinates ($rb_x$, $rb_y$); random moving values of the coordinates ($lt_x$, $lt_y$) of the vertex 1 is set as $\delta_x$, $\delta_y$; random moving values of the coordinates ($rb_x$, $rb_y$) of the vertex 4 is set as $\sigma_x$, $\sigma_y$, wherein values are positive and negative. After random movement, the new vertex 1 has coordinates ($lt1_x$, $lt1_y$):

$$lt1_x = lt_x + \delta_x$$

$$lt1_y = lt_y + \delta_y$$

The new vertex 4 has coordinates ($rb1_x$, $rb1_y$):

$$rb1_x = rb_x + \sigma_x$$

$$rb1_y = rb_y + \sigma_y$$

The step S314-2 includes adjusting a width and a height of the third reference frame according to a preset scaling factor by taking a central point of the third reference frame as a center according to position information of the third reference frame to obtain a fourth reference frame.

Continuing the above example, the central point of the third reference frame has coordinates ($c_x$, $c_y$), the width of the third reference frame is w, and the height of the third reference frame is h; the preset scaling factor includes a width scaling factor $s_x$ and a height scaling factor $s_y$. The width and the height of the third reference frame are adjusted according to the preset scaling factor to obtain coordinates ($lt2_x$, $lt2_y$) of the vertex 1 in the upper left corner of the fourth reference frame and coordinates ($rb2_x$,$rb2_y$) of the vertex 4 in the lower right corner of the fourth reference frame, wherein:

$$c_x = (lt1_x + rb1_x)/2,\ c_y = (lt1_y + rb1_y)/2$$

$$w = (rb1_x - lt1_x),\ h = (rb1_y - lt1_y)$$

$$lt2_x = c_x - s_x \times w/2$$

$$lt2_y = c_y - s_y \times h/2$$

$$rb2_x = c_x + s_x \times w/2$$

$$rb2_y = c_y + s_y \times h/2$$

The step S314-3 includes determining a new central point according to position information of the fourth reference frame and the first preset central point range; and adjusting the width and the height of the fourth reference frame according to the new central point and the preset cropping range to obtain the second reference frame.

Here, the width of the fourth reference frame is $w'=(rb2_x-lt2_x)$, the height is $h'=(rb2_y-lt2_y)$; the first preset central point range is a range where the randomly generated central point ($cnew_x$, $cnew_y$) is located, wherein $cnew_x$Å[0.45×w', 0.55×w'], $cnew_y \in$ [0.45×h', 0.55×h']. The preset cropping range is a range of the width wnew and the height hnew of the randomly generated fourth reference frame, wherein wnew∈ [w'×0.9, w'], hnew∈ [h'×0.9, h'].

The width and the height of the fourth reference frame are adjusted according to the new central point ($cnew_x$, $cnew_y$) and the preset cropping range to obtain a new width wnew' and a new height hnew', and further obtain a new contour coordinate point, that is, coordinates in the upper left corner are ($lt3_x$, $lt3_y$) and coordinates in the lower right corner are ($rb3_x$, $rb3_y$).

The diversified training images can be obtained and the subsequent model training precision can be improved in the above updating mode.

The step S315 includes determining an overlapping degree of the second reference frame and the first reference frame according to the position information of the second reference frame and the position information of the first reference frame.

The overlapping degree IOU characterizes the overlapping degree by which the first reference frame overlaps the second reference frame. The larger a value of the IOU is, the larger an overlapping area of the second reference frame and the first reference frame is, and the more a proportion of the target object in the second reference frame is; vice versa.

The step S316 includes labeling a sample label for a partial sample image of the initial sample image in the second reference frame according to a comparison result between the overlapping degree and a first preset threshold, and taking the partial sample image labeled with the sample label as the training image in the first training data set.

Here, the first preset threshold may be set empirically, and in a case where the overlapping degree is greater than or equal to the first preset threshold, the corresponding sample images are determined to be positive samples, and are labeled with positive sample labels. It should be noted that although the overlapping degree is greater than or equal to the first preset threshold, the overlapping degree only reflects that a part of the target objects exists in the second reference frame, and the features of the part of the target objects may be features that may obviously represent the identity of the user, such as a head, or features that cannot obviously represent the identity of the user, such as limbs.

The diversified training images are generated, so that the richness of the first training data set can be improved, and therefore the model training precision is improved. The diversified means that features of a divided target object in the training image are diversified, such as a large number of training images including head features of the target objects, a part of training images including only limb features, a part of training images including torso features, a part of training images including whole-body features of the target objects, and the like. In some embodiments, in the step S315, each initial sample image corresponds to a corresponding overlapping degree (or each training image corresponds to a corresponding overlapping degree).

In specific implementation, when the overlapping degree is greater than or equal to the first preset threshold, a first preset range may be generated according to a first preset probability, a second preset range may be generated according to a second preset probability, a third preset range may be generated according to a third preset probability, and a fourth preset range may be generated according to a fourth preset probability; the first preset probability is greater than the second preset probability, the second preset probability is greater than the third preset probability, and the third preset probability is greater than or equal to the fourth preset probability; a sum of the first preset probability, the second preset probability, the third preset probability and the fourth preset probability is 1.

When the overlapping degree is within the first preset range, a partial sample image, which is positioned in the second reference frame, of the initial sample image is determined and labeled as a positive sample label, so that a ratio of the number of training images with the overlapping degree within the first preset range to the total number of training images with the positive sample labels in the first training data set is the first preset probability.

When the overlapping degree is within the second preset range, a partial sample image, which is positioned in the second reference frame, of the initial sample images is determined and labeled as a positive sample label, so that a ratio of the number of training images with the overlapping degree within the second preset range to the total number of training images with the positive sample labels in the first training data set is the second preset probability.

When the overlapping degree is within the third preset range, a partial sample image, which is positioned in the second reference frame, of the initial sample image is determined and labeled as a positive sample label, so that a ratio of the number of training images with the overlapping degree within the third preset range to the total number of training images with the positive sample labels in the first training data set is the third preset probability.

When the overlapping degree is within the fourth preset range, a partial sample image, which is positioned in the second reference frame, of the initial sample images is determined and labeled as a positive sample label, so that a ratio of the number of training images with the overlapping degree within the fourth preset range to the total number of training images with the positive sample labels in the first training data set is the fourth preset probability.

The overlapping degree in the first preset range is smaller than that in the second preset range, the overlapping degree in the second preset range is smaller than that in the third preset range, and the overlapping degree in the third preset range is smaller than that in the fourth preset range.

For example, the first preset threshold is 0.6. If the overlapping degree is greater than or equal to 0.6, the first preset range of 0.6 to 0.7 (excluding 0.7) is selected according to a probability of 50% (i.e., the first preset probability), the first preset range of 0.7 to 0.8 (excluding 0.8) is selected according to a probability of 30% (i.e., the second preset probability), the first preset range of 0.8 to 0.9 (excluding 0.9) is selected according to a probability of 10% (i.e., the third preset probability), and the first preset range of 0.9 to 1.0 is selected according to a probability of 10% (i.e., the fourth preset probability). When the overlapping degree is within the first preset range, a partial sample image in the second reference frame is labeled as the positive sample label, so that the training images with the overlapping degree within the first preset range occupy 50% of the total number of all the training images with the positive sample labels. When the overlapping degree is within the second preset range, a partial sample image in the second reference frame is labeled as the positive sample label, so that the training images with the overlapping degree within the second preset range occupy 30% of the total number of all the training images with the positive sample labels. When the overlapping degree is within the third preset range, a partial sample image in the second reference frame is labeled as the positive sample label, so that the training images with the overlapping degree within the third preset range occupy 10% of the total number of all the training images with the positive sample labels. When the overlapping degree is within the fourth preset range, a partial sample image in the second reference frame is labeled as the positive sample label, so that the training images with the overlapping degree within the fourth preset range occupy 10% of the total number of all the training images with the positive sample labels.

In this embodiment, a proportion of the positive samples in the first training data set is preset, and the first preset range of 0.6 to 0.7 is selected according to the probability of 50%, that is, the positive samples with IOU being [0.6,0.7) are controlled to occupy 50% of the total positive sample data; the second preset range of 0.7 to 0.8 is selected according to the probability of 30%, that is, the positive samples with IOU being [0.7,0.8) are controlled to occupy 30% of the total positive sample data; the third preset range of 0.8 to 0.9 is selected according to the probability of 10%, that is, the positive samples with IOU being [0.8,0.9) are controlled to occupy 10% of the total positive sample data; the fourth preset range of 0.9 to 1.0 is selected according to the probability of 10%, that is, the positive samples with IOU being [0.9, 1.0) are controlled to occupy 10% of the total positive sample data. Because the target neural network model in the embodiment of the present disclosure is a small model and the image to be detected is divided into the plurality of target sub-images, the training image also adopts the image obtained by dividing in the whole image so as to improve the model training precision. In the process of generating the first training data set, images (i.e., some sample images) with the divided target object are generated as the training images as many as possible.

The division of the proportion of the positive samples in the first training data set is only one embodiment, and other proportion may alternatively be set, so as to satisfy the condition of enriching the training samples, which is not limited in the embodiment of the present disclosure.

The step S317 includes labeling the initial sample image with a negative sample label, and taking the initial sample image labeled with the negative sample label as a training image in the first training data set.

This step is to label the initial sample image that does not contain the target object with the negative sample label.

In some embodiments, in a case that the overlapping degree between the first reference frame and the second reference frame is less than a third preset threshold, the partial sample image of the initial sample image in the second reference frame is labeled with the negative sample label. Here, the second preset threshold may be set empirically, and is smaller than the first preset threshold. For example, the third preset threshold is 0.1, so that the partial sample image labeled with the negative sample label does not mean that no feature of the target object is present in the partial sample image, but the feature is very small and may be ignored, and thus the partial sample image may be used as the negative sample.

Alternatively, besides the above way of forming the negative samples, a partial sample image not containing the target object may be intercepted from the initial sample image as the negative sample; and/or, a partial sample image containing only a few features of the target object may be intercepted from the initial sample image as the negative sample, and so on, which is not particularly limited in this embodiment of the present disclosure.

In some embodiments, after the step S312, the method includes forming the negative samples in another way, specifically: determining a target central point in the initial sample image according to a size of the initial sample image and the second preset central point range, and determining a fifth reference frame by taking the target central point as a center; determining an overlapping degree of the fifth reference frame and any first reference frame in the initial sample image according to position information of the fifth reference frame and the position information of the first reference frame. If the overlapping degree of the fifth reference frame and any first reference frame in the initial sample image is smaller than or equal to the second preset threshold, a partial sample image of the initial sample image in the fifth reference frame is labeled as the negative sample label, and the a partial sample image labeled with the negative sample label is used as the training image in the first training data set.

Here, the second preset threshold may be selected to be a threshold in the range from 0 to 0.1. The fifth reference frame is defined by randomly setting a target central point in the initial sample image. The partial sample image corresponding to the first reference frame contains the target object, if the overlapping degree of the fifth reference frame and any first reference frame is less than or equal to the second preset threshold, which means that the overlapping degree of the fifth reference frame and any first reference frame is small, even equal to 0, the partial sample image corresponding to the fifth reference frame may be considered to contain no target object, and therefore, may be used as the negative sample training image.

It will be understood by one of ordinary skill in the art that in the above method for the present embodiment, the order of steps does not imply a strict order of executing the steps and does not impose any limitations on the implementation, as the specific order of the steps should be determined by their functions and possibly inherent logic.

It should be noted that except for the detection of the target object mentioned in the embodiment of the present disclosure and an operation of an awakening device, an application service of the portable intelligent terminals in the aspects of the smart home and the wearable device may adopt the computing and memory manner with high energy efficiency, thereby reducing a large amount of cost. With the development of storage and computing technology, a larger deep learning model, and wider and universal services can be supported. In addition, because functions and operators supported by different storage and computing platforms are different, a network can be designed and built according to an actual hardware platform in the present disclosure, and is not limited to the target neural network model provided in the present disclosure.

In addition, the embodiment of the present disclosure further provides another control method for a broadcast monitoring system, wherein the execution main body of the control method for a broadcast monitoring system may be the broadcast monitoring system, including a computing and memory system and a terminal; the computing and memory system includes a processing module, a computing and memory module and an external storage module. The processing module is, for example, a main processor CPU in the computing and memory system, the computing and memory module may be, for example, a storage and computing core integrated with the flash or the SRAM, and the external storage module may be, for example, an external storage module DRAM, so that the faster response speed is achieved, and the power consumption of the broadcast monitoring system is reduced. The control method for a broadcast monitoring system includes the following steps.

The processing module acquires an image to be detected, divides the image to be detected into a plurality of target sub-images according to the shooting visual angle of the shooting device for shooting the image to be detected, and stores the target sub-images into the external storage module. It should be noted that for the specific implementation process of the image dividing module in the embodiment of the present disclosure, reference may be made to the steps S11 and S12 in the control method for a broadcast monitoring system, and repeated details are not repeated.

The computing and memory module processes each target sub-image in the plurality of target sub-images by using a pre-trained target neural network model to obtain a recognition result for the target sub-image, and stores the recognition result into an external storage module. It should be noted that for a specific implementation process of the computing and memory module in the embodiment of the present disclosure, reference may be made to the step S13 in the control method for a broadcast monitoring system, and repeated details are not described again. The computing and memory module is integrated with the target neural network model.

The processing module obtains the detection result of whether the target object exists in the image to be detected or not based on the recognition result corresponding to each target sub-image, and sends the detection result to the terminal. It should be noted that for a specific execution process of the processing module in the embodiment of the present disclosure, reference may be made to the step S13 in the control method for a broadcast monitoring system, and repeated details are not repeated.

The terminal determines a display state based on the detection result.

In the control method for a broadcast monitoring system provided by the embodiment of the present disclosure, an image shot by a shooting device is detected by using a neural network, and a detection result is fed back to a terminal, so that the terminal determines a current display state based on the detection result. For example, if no target object is detected for a long time, the terminal may enter a sleep state, thereby saving the system power consumption. If the detection result indicates in the sleep state of the terminal that a target object appears, the terminal may self-start and recover the normal display. In addition, in an intelligent awakening application scene in the embodiment of the present disclosure, while the system power consumption is saved, the image to be detected shot by the shooting device is reasonably divided into a plurality of target sub-images according to a shooting visual angle in combination with the neural network image recognition technology, the target sub-images are respectively recognized, and recognition results for the target sub-images are integrated to obtain the detection result, thereby improving the recognition precision for the target object in the image to be detected, and therefore controlling the awakening time for the terminal more accurately. In addition, a computing and memory module, which is a system architecture integrated with the computing and storage functions, is utilized to support the complex data calculation in the neural network, so that the energy loss caused in a data carrying process is greatly avoided, and the system power consumption is reduced.

In some embodiments, the terminal includes a display module and a main control module; the determining, by the terminal, a display state based on the detection result, including: sending, by the main control module, an awakening request to the display module and resetting a sleep timer when it is determined that the detection result indicates that the target object exists in the image to be detected, to receive the detection result sent by the processing module in response to a terminal request; sending, by the main control module, a sleep request to the display module and controlling the main control module to enter the sleep state when it is determined that the detection result indicates that the target object does not exist in the image to be detected and a difference between the current system time and the latest awakening time of the display module is longer than a preset duration; determining, by the display module, that the display state is normally displaying a picture shot by the shooting device in response to the awakening request; determining, by the display module, that the display state is sleep in response to the sleep request.

Here, the preset duration may be set empirically. It should be noted that the preset duration is reasonably set, so that the terminal reasonably enters the sleep state in an actual application scene. If the preset duration is too short, it is caused to be frequently switched between the sleep state and the awakening state, which is not beneficial to reducing the power consumption. If the preset duration is too long, the power consumption of the terminal cannot be reduced to the maximum extent.

Here, the display module may, for example, be a display screen, and the main control module may, for example, be a system on chip (SOC). The main control module and the image dividing module may be communicated with each other by adopting a UART (Universal Asynchronous Receiver/Transmitter) protocol or other protocol.

Figure 6A:
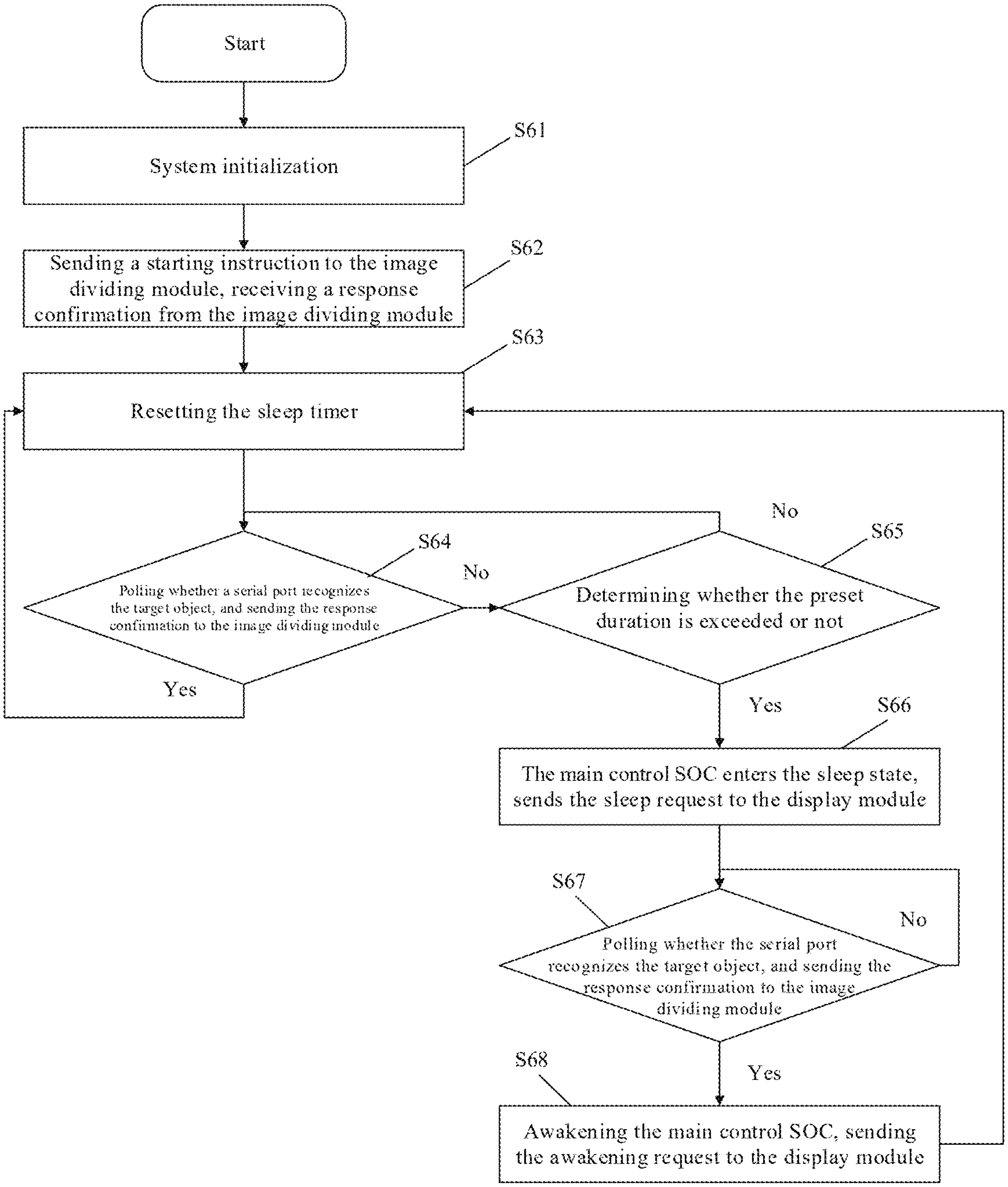
FIG. 6*a* is a flowchart of an exemplary operation of a terminal according to an embodiment of the present disclosure.

FIG. 6*a* is a flowchart of an exemplary operation of a terminal according to an embodiment of the present disclosure. As shown in FIG. 6*a*, the main control module is configured to perform following steps S61 to S68: S61, starting system initialization; S62, sending a starting instruction to the image dividing module, receiving a response confirmation from the image dividing module, and then executing S63; S63, resetting the sleep timer; S64, polling whether a serial port recognizes the target object, and sending the response confirmation to the image dividing module; if the serial port recognizes the target object, returning to execute the step S63; if the serial port does not recognize the target object, executing S65; S65, determining whether the preset duration is exceeded or not; if so, executing S66; if not, returning to execute the step S64; S66, the main control SOC enters the sleep state, sends the sleep request to the display module and then executing S67; S67, polling whether the serial port recognizes the target object, and sending the response confirmation to the image dividing module; if the serial port recognizes the target object, executing S68; if the serial port does not recognize the target object, repeatedly executing S67; and S68, awakening the main control SOC, sending the awakening request to the display module, and returning to the step S63.

Figure 6B:
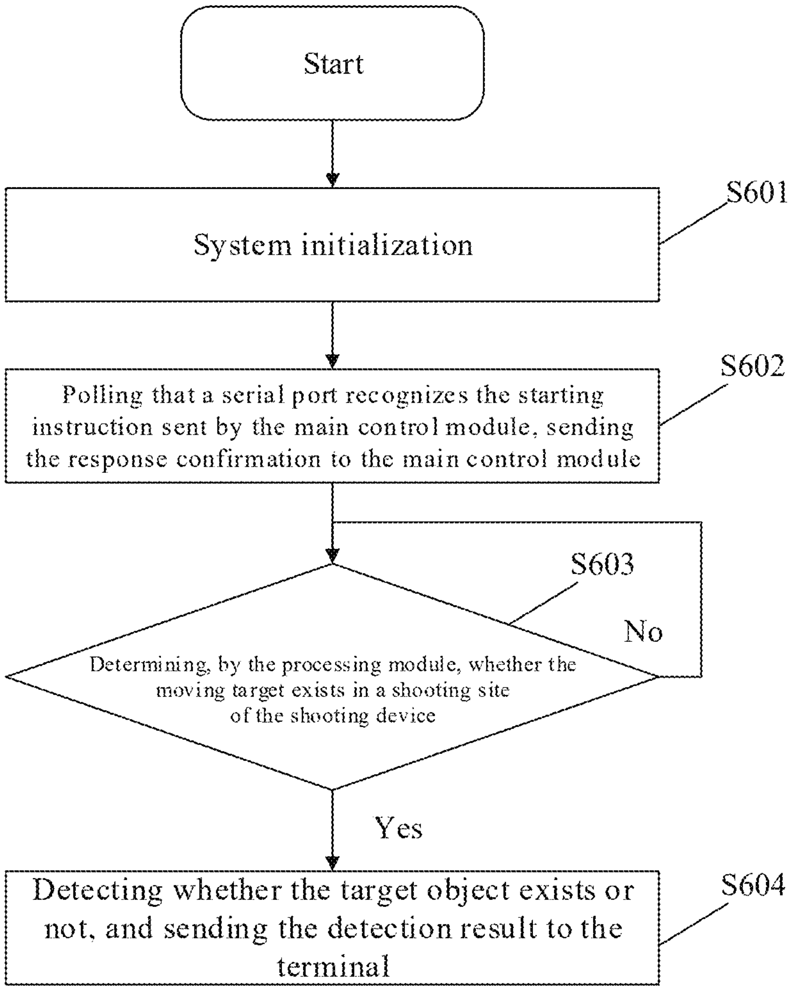
FIG. 6*b* is a flowchart of an exemplary operation of a computing and memory system according to an embodiment of the present disclosure.

FIG. 6*b* is a flowchart of an exemplary operation of a computing and memory system according to an embodiment of the present disclosure. As shown in FIG. 6*b*, the computing and memory system is configured to perform following steps S601 to S604: S601, starting system initialization; S602, polling, by the processing module, that a serial port recognizes the starting instruction sent from the main control module, sending the response confirmation to the main control module and then executing S603; S603, detecting a moving target by the processing module, that is, determining whether the moving target exists in a shooting site of the shooting device by adopting a frame difference method; if so, executing step S604, namely starting the computing and memory module to perform the target object recognition function, wherein the detailed process refers to the process of determining the detection result in the steps S12 to S14; if not, repeating the step S603. The step S604 includes detecting whether the target object exists or not, and sending the detection result to the terminal.

In some embodiments, the broadcast monitoring system further includes a shooting device, and the image dividing module may obtain data of the shooting device with the low power consumption through an SPI (Serial Peripheral Interface) protocol or other protocol.

The control process of a broadcast monitoring system specifically implemented by the computing and memory system is described in the following embodiments, and for a detailed process, reference may be made to the description of a specific embodiment of the control method for a broadcast monitoring system with the computing and memory system as the execution main body, and repeated details are not described again.

In some embodiments, the dividing, by the processing module, the image to be detected into a plurality of target sub-images according to the shooting visual angle of the shooting device, includes:

Under the condition that the shooting visual angle is within a preset visual angle range, the image to be detected is divided into a first sub-region, a second sub-region and a third sub-region which are arranged sequentially along a first direction, wherein the first sub-region and the third sub-region partially overlap with the second sub-region, a width of the first sub-region in the first direction is equal to a width of the third sub-region in the first direction, and a width of the second sub-region in the first direction is greater than the width of the first sub-region in the first direction, the first direction is a height direction of the image to be detected.

A part of the image to be detected in the first sub-region is divided into a plurality of first sub-images arranged side by side along a second direction, wherein widths of at least part of the first sub-images in the second direction are the same, the second direction is a width direction of the image to be detected.

A part of the image to be detected in the second sub-region is divided into a plurality of second sub-images arranged side by side along the second direction, wherein widths of at least part of the second sub-images in the second direction are the same.

A part of the image to be detected in the third sub-region is divided into a plurality of third sub-images arranged side by side along the second direction, wherein widths of at least part of the third sub-images in the second direction are the same. The target sub-image includes a first sub-image, a second sub-image, and a third sub-image.

A width of the third sub-image in the second direction is larger than a width of the second sub-image in the second direction, the width of the second sub-image in the second direction is larger than a width of the first sub-image in the second direction.

In some embodiments, the adjacent first sub-images at least partially overlap with each other in the second direction; the adjacent second sub-images at least partially overlap with each other in the second direction; and the third sub-images do not overlap with each other in the second direction.

In some embodiments, a ratio of the width of the second sub-region to the width of the first sub-region in the first direction is 2:1.

A ratio of the widths of the third sub-image and the second sub-image in the second direction is 3:2, and a ratio of the widths of the second sub-image and the first sub-image in the second direction is 4:3.

In some embodiments, in the plurality of first sub-images arranged side by side in the second direction, the remaining first sub-images, except for the 1st first sub-image and the last first sub-image arranged side by side in the second direction, have the same width in the second direction; the 1st first sub-image and the last first sub-image have the same width in the second direction, which is smaller than the width of the remaining first sub-image in the second direction; a ratio of an overlapping width of two adjacent first sub-images in the second direction to the width of the remaining first sub-image in the second direction is 1:10.

In the plurality of second sub-images arranged side by side in the second direction, the remaining second sub-images, except for the 1st second sub-image and the last second sub-image arranged side by side in the second direction, have the same width in the second direction; the 1st second sub-image and the last second sub-image have the same width in the second direction, which is smaller than the width of the remaining second sub-image in the second direction; a ratio of an overlapping width of two adjacent second sub-images in the second direction to the width of the remaining second sub-image in the second direction is 1:10.

In the plurality of third sub-images arranged side by side in the second direction, the remaining third sub-images, except for the 1st third sub-image and the last third sub-image arranged side by side in the second direction, have the same width in the second direction; the 1st third sub-image and the last third sub-image have the same width in the second direction, which is smaller than the width of the remaining third sub-image in the second direction; a ratio of an overlapping width of two adjacent third sub-images in the second direction to the width of the remaining third sub-image in the second direction is 1:10.

A ratio of an overlapping width in the first direction of a first sub-image and a second sub-image adjacent to each other in the first direction to the width of the second sub-image in the first direction is 1:10. A ratio of an overlapping width in the first direction of a third sub-image and a second sub-image adjacent to each other in the first direction to the width of the second sub-image in the first direction is 1:10.

In some embodiments, the target neural network model is trained by the following steps performed by the processing module:

Acquiring a first training data set and a second training data set, wherein the second training data set may be obtained by filtering the first training data set;

Training a teacher machine learning model to be trained according to the first training data set to obtain a preliminarily trained teacher machine learning model;

Training the preliminarily trained teacher machine learning model according to the second training data set to obtain the trained teacher machine learning model; and Training the student machine learning model to be trained by adopting a knowledge distillation training method according to the second training data set and the trained teacher machine learning model, to obtain the trained student machine learning model as the target neural network model.

In some embodiments, the second training data set includes a plurality of training images labeled with the sample labels.

The training, by the processing module, the student machine learning model to be trained by adopting a knowledge distillation training method according to the second training data set and the trained teacher machine learning model, to obtain the trained student machine learning model as the target neural network model, includes the following steps:

Inputting the training image into the trained teacher machine learning model to obtain a first output result for the trained teacher machine learning model;

Inputting the training image into the student machine learning model to be trained to obtain a second output result for the student machine learning model to be trained;

Determining a first loss function according to the first output result and the second output result;

Determining a second loss value according to the second output result and the sample label of the training image;

Obtaining a weighted loss function according to the first loss function and the second loss function; and Adjusting parameters of the student machine learning model to be trained according to a weighted loss function until the weighted loss function is converged, and obtaining the trained student machine learning model as the target neural network model.

In some embodiments, the first training data set is obtained by the following steps performed by the processing module:

Acquiring an original data set, wherein the original data set includes a plurality of initial sample images;

Performing a target object recognition on the initial sample image. If the target object is present, determining a first reference frame containing the target object;

Updating a position of the first reference frame according to the position information of the first reference frame to obtain a second reference frame;

Determining an overlapping degree of the second reference frame and the first reference frame according to the position information of the second reference frame and the position information of the first reference frame; and Labeling a sample label for a partial sample image of the initial sample image in the second reference frame according to a comparison result between the overlapping degree and a first preset threshold, and taking the partial sample image labeled with the sample label as the training image in the first training data set.

In some embodiments, the updating, by the processing module, a position of the first reference frame according to the position information of the first reference frame to obtain a second reference frame, includes the following steps:

Moving a specific coordinate point in the first reference frame according to the position information of the first reference frame to obtain a third reference frame;

Adjusting a width and a height of the third reference frame according to a preset scaling factor by taking a central point of the third reference frame as a center according to position information of the third reference frame, to obtain a fourth reference frame; and Determining a new central point according to position information of the fourth reference frame and the first preset central point range; and adjusting the width and the height of the fourth reference frame according to the new central point and the preset cropping range to obtain the second reference frame.

In some embodiments, the labeling, by the processing module, the sample label for the partial sample image of the initial sample image in the second reference frame according to a comparison result between the overlapping degree and a first preset threshold, includes the following steps:

When the overlapping degree is greater than or equal to the first preset threshold, generating a first preset range according to a first preset probability, generating a second preset range according to a second preset probability, generating a third preset range according to a third preset probability, and generating a fourth preset range according to a fourth preset probability; wherein the first preset probability is greater than the second preset probability, the second preset probability is greater than the third preset probability, and the third preset probability is greater than or equal to the fourth preset probability; a sum of the first preset probability, the second preset probability, the third preset probability and the fourth preset probability is 1.

When the overlapping degree is within the first preset range, determining and labeling a partial sample image, which is positioned in the second reference frame, in the initial sample image as a positive sample label, so that a ratio of the number of training images with the overlapping degree within the first preset range to the total number of training images with the positive sample labels in the first training data set is the first preset probability.

When the overlapping degree is within the second preset range, determining and labeling a partial sample image, which is positioned in the second reference frame, in the initial sample image as a positive sample label, so that a ratio of the number of training images with the overlapping degree within the second preset range to the total number of training images with the positive sample labels in the first training data set is the second preset probability.

When the overlapping degree is within the third preset range, determining and labeling a partial sample image, which is positioned in the second reference frame, in the initial sample image as a positive sample label, so that a ratio of the number of training images with the overlapping degree within the third preset range to the total number of training images with the positive sample labels in the first training data set is the third preset probability.

When the overlapping degree is within the fourth preset range, determining and labeling a partial sample image, which is positioned in the second reference frame, in the initial sample image as a positive sample label, so that a ratio of the number of training images with the overlapping degree within the fourth preset range to the total number of training images with the positive sample labels in the first training data set is the fourth preset probability.

The overlapping degree in the first preset range is smaller than the overlapping degree in the second preset range, the overlapping degree in the second preset range is smaller than the overlapping degree in the third preset range, and the overlapping degree in the third preset range is smaller than the overlapping degree in the fourth preset range.

In some embodiments, in the case that the target object recognition is performed on the initial sample image to determine that the target object does not exist, the obtaining, by the processing module, the first training data set, further includes the following step:

Labeling the initial sample image with a negative sample label, and taking the initial sample image labeled with the negative sample label as a training image in the first training data set.

In some embodiments, after the target object recognition is performed by the processing module on the initial sample image to determine that the target object exists, and determine the first reference frame containing the target object, the method further includes the following steps:

Determining a target central point in the initial sample image according to a size of the initial sample image and the second preset central point range, and determining a fifth reference frame by taking the target central point as a center;

Determining an overlapping degree of the fifth reference frame and any first reference frame in the initial sample image according to position information of the fifth reference frame and the position information of the first reference frame; and Labeling a partial sample image of the initial sample image in the fifth reference frame as the negative sample label if the overlapping degree of the fifth reference frame and any first reference frame in the initial sample image is smaller than or equal to the second preset threshold, and using the partial sample image labeled with the negative sample label as the training image in the first training data set.

In some embodiments, acquiring, by the processing module, the image to be detected, includes the following steps:

Acquiring a plurality of continuous video frames shot by the shooting device; and Determining whether the moving target exists in the shooting site of the shooting device by adopting the frame difference method according to the plurality of continuous video frames; if the moving target exists, taking the video frame shot by the shooting device as the image to be detected.

In addition, the embodiment of the present disclosure further provides a computing and memory system corresponding to the control method for a broadcast monitoring system in the first aspect. As the principle of solving the problem of the computing and memory system in the embodiment of the present disclosure is similar to that of the control method for a broadcast monitoring system in the first aspect in the embodiment of the present disclosure, the implementation of the computing and memory system may refer to that of the corresponding method in the first aspect, and repeated parts are not described again.

Figure 7:
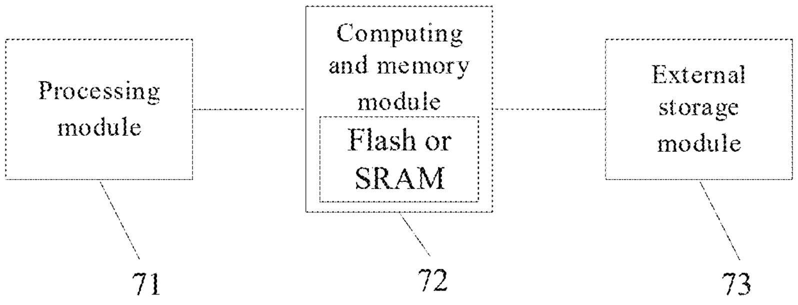
FIG. 7 is a schematic diagram of a computing and memory system according to an embodiment of the present disclosure.

FIG. 7 is a schematic diagram of a computing and memory system according to an embodiment of the present disclosure. As shown in FIG. 7, the computing and memory system includes a processing module 71, a computing and memory module 72, and an external storage module 73. The processing module is, for example, a main processor CPU in the computing and memory system, the computing and memory module may be, for example, a storage and computing core integrated with the flash or the SRAM, and the external storage module may be, for example, an external storage module DRAM, so that the faster response speed is achieved, and the power consumption of the broadcast monitoring system is reduced. The computing and memory system may be a part of the broadcast monitoring system. Meanwhile, the lightweight target neural network model designed in the present disclosure is migrated into the computing and memory module, and a low-power-consumption computing and memory mode is employed to help the target neural network realize inference, so that the awakening service for the intelligent terminal is completed, the power consumption is reduced, and the faster response speed is achieved.

The processing module 71 is configured to acquire an image to be detected; divide the image to be detected into a plurality of target sub-images according to a shooting visual angle of the shooting device for shooting the image to be detected, and store the plurality of target sub-images in the external storage module 73.

The computing and memory module 72 is configured to process each of the plurality of target sub-images by using a pre-trained target neural network model to obtain a recognition result for the target sub-image, and store the recognition result in the external storage module 73.

The processing module 71 is configured to obtain the detection result of whether the target object exists in the image to be detected or not based on the recognition result corresponding to each target sub-image, and send the detection result to the terminal so that the terminal determines the display state based on the detection result.

In some embodiments, the processing module 71 is specifically configured divide the image to be detected into a first sub-region, a second sub-region and a third sub-region which are arranged sequentially along a first direction under the condition that the shooting visual angle is within a preset visual angle range, wherein the first sub-region and the third sub-region partially overlap with the second sub-region, a width of the first sub-region in the first direction is equal to a width of the third sub-region in the first direction, and a width of the second sub-region in the first direction is greater than the width of the first sub-region in the first direction, the first direction is a height direction of the image to be detected; a part of the image to be detected in the first sub-region is divided into a plurality of first sub-images arranged side by side along a second direction, wherein widths of at least part of the first sub-images in the second direction are the same, the second direction is a width direction of the image to be detected; a part of the image to be detected in the second sub-region is divided into a plurality of second sub-images arranged side by side along the second direction, wherein widths of at least part of the second sub-images in the second direction are the same; a part of the image to be detected in the third sub-region is divided into a plurality of third sub-images arranged side by side along the second direction, wherein widths of at least part of the third sub-images in the second direction are the same. The target sub-image includes a first sub-image, a second sub-image, and a third sub-image; a width of the third sub-image in the second direction is larger than a width of the second sub-image in the second direction, the width of the second sub-image in the second direction is larger than the width of the first sub-image in the second direction.

In some embodiments, the adjacent first sub-images at least partially overlap with each other in the second direction; the adjacent second sub-images at least partially overlap with each other in the second direction; and the third sub-images do not overlap with each other in the second direction.

In some embodiments, a ratio of the width of the second sub-region to the width of the first sub-region in the first direction is 2:1. A ratio of the widths of the third sub-image and the second sub-image in the second direction is 3:2, and a ratio of the widths of the second sub-image and the first sub-image in the second direction is 4:3.

In some embodiments, in the plurality of first sub-images arranged side by side in the second direction, the remaining first sub-images, except for the 1st first sub-image and the last first sub-image arranged side by side in the second direction, have the same width in the second direction; the 1st first sub-image and the last first sub-image have the same width in the second direction, which is smaller than the width of the remaining first sub-image in the second direction; a ratio of an overlapping width of two adjacent first sub-images in the second direction to the width of the remaining first sub-image in the second direction is 1:10. In the plurality of second sub-images arranged side by side in the second direction, the remaining second sub-images, except for the 1st second sub-image and the last second sub-image arranged side by side in the second direction, have the same width in the second direction; the 1st second sub-image and the last second sub-image have the same width in the second direction, which is smaller than the width of the remaining second sub-image in the second direction; a ratio of an overlapping width of two adjacent second sub-images in the second direction to the width of the remaining second sub-image in the second direction is 1:10. In the plurality of third sub-images arranged side by side in the second direction, the remaining third sub-images, except for the 1st third sub-image and the last third sub-image arranged side by side in the second direction, have the same width in the second direction; the 1st third sub-image and the last third sub-image have the same width in the second direction, which is smaller than the width of the remaining third sub-image in the second direction; a ratio of an overlapping width of two adjacent third sub-images in the second direction to the width of the remaining third sub-image in the second direction is 1:10. A ratio of an overlapping width in the first direction of a first sub-image and a second sub-image adjacent to each other in the first direction to the width of the second sub-image in the first direction is 1:10. A ratio of an overlapping width in the first direction of a third sub-image and a second sub-image adjacent to each other in the first direction to the width of the second sub-image in the first direction is 1:10.

In some embodiments, the processing module 71 is further configured to train the target neural network model, in particular, including: acquiring a first training data set and a second training data set, wherein the second training data set may be obtained by filtering the first training data set; training a teacher machine learning model to be trained according to the first training data set to obtain a preliminarily trained teacher machine learning model; training the preliminarily trained teacher machine learning model according to the second training data set to obtain the trained teacher machine learning model; and training the student machine learning model to be trained by adopting a knowledge distillation training method according to the second training data set and the trained teacher machine learning model, to obtain the trained student machine learning model as the target neural network model.

In some embodiments, the second training data set includes a plurality of training images labeled with the sample labels. The processing module 71 is specifically configured to input the training image into the trained teacher machine learning model to obtain a first output result for the trained teacher machine learning model; input the training image into the student machine learning model to be trained to obtain a second output result for the student machine learning model to be trained; determine a first loss function according to the first output result and the second output result; determine a second loss value according to the second output result and the sample label of the training image; obtain a weighted loss function according to the first loss function and the second loss function; and adjust parameters of the student machine learning model to be trained according to a weighted loss function until the weighted loss function is converged, to obtain the trained student machine learning model as the target neural network model.

In some embodiments, the processing module 71 is further configured to determine the first training data set, in particular, including: acquiring an original data set, wherein the original data set includes a plurality of initial sample images; performing a target object recognition on the initial sample image; if the target object is present, determining a first reference frame containing the target object; updating a position of the first reference frame according to the position information of the first reference frame to obtain a second reference frame; determining an overlapping degree of the second reference frame and the first reference frame according to the position information of the second reference frame and the position information of the first reference frame; and labeling a sample label for a partial sample image of the initial sample image in the second reference frame according to a comparison result between the overlapping degree and a first preset threshold, and taking the partial sample image labeled with the sample label as the training image in the first training data set.

In some embodiments, in combination with the above embodiments, the processing module 71 is specifically configured to move a specific coordinate point in the first reference frame according to the position information of the first reference frame to obtain a third reference frame; adjust a width and a height of the third reference frame according to a preset scaling factor according to position information of the third reference frame by taking a central point of the third reference frame as a center, to obtain a fourth reference frame; and determine a new central point according to position information of the fourth reference frame and the first preset central point range; and adjust the width and the height of the fourth reference frame according to the new central point and the preset cropping range to obtain the second reference frame.

In some embodiments, in combination with the above embodiments, the processing module 71 is specifically configured to: when the overlapping degree is greater than or equal to the first preset threshold, generate a first preset range according to a first preset probability, generate a second preset range according to a second preset probability, generate a third preset range according to a third preset probability, and generate a fourth preset range according to a fourth preset probability; wherein the first preset probability is greater than the second preset probability, the second preset probability is greater than the third preset probability, and the third preset probability is greater than or equal to the fourth preset probability; a sum of the first preset probability, the second preset probability, the third preset probability and the fourth preset probability is 1; when the overlapping degree is within the first preset range, determine and label a partial sample image, which is positioned in the second reference frame, in the initial sample image as a positive sample label, so that a ratio of the number of training images with the overlapping degree within the first preset range to the total number of training images with the positive sample labels in the first training data set is the first preset probability; when the overlapping degree is within the second preset range, determine and label a partial sample image, which is positioned in the second reference frame, in the initial sample image as a positive sample label, so that a ratio of the number of training images with the overlapping degree within the second preset range to the total number of training images with the positive sample labels in the first training data set is the second preset probability; when the overlapping degree is within the third preset range, determine and label a partial sample image, which is positioned in the second reference frame, in the initial sample images as a positive sample label, so that a ratio of the number of training images with the overlapping degree within the third preset range to the total number of training images with the positive sample labels in the first training data set is the third preset probability; and when the overlapping degree is within the fourth preset range, determine and label a partial sample image, which is positioned in the second reference frame, in the initial sample images as a positive sample label, so that a ratio of the number of training images with the overlapping degree within the fourth preset range to the total number of training images with the positive sample labels in the first training data set is the fourth preset probability, wherein the overlapping degree in the first preset range is smaller than the overlapping degree in the second preset range, the overlapping degree in the second preset range is smaller than the overlapping degree in the third preset range, and the overlapping degree in the third preset range is smaller than the overlapping degree in the fourth preset range.

In some embodiments, the processing module 71 is further configured to label the initial sample image with a negative sample label in the case that the target object recognition performed on the initial sample image indicates that no target object exists, and take the initial sample image labeled with the negative sample label as a training image in the first training data set.

In some embodiments, after the target object recognition performed on the initial sample image indicates that a target object exists, and the first reference frame containing the target object is determined, the processing module 71 is further configured to: determine a target central point in the initial sample image according to a size of the initial sample image and the second preset central point range, and determine a fifth reference frame by taking the target central point as a center; determine an overlapping degree of the fifth reference frame and any first reference frame in the initial sample image according to position information of the fifth reference frame and the position information of the first reference frame; and label a partial sample image of the initial sample image in the fifth reference frame as the negative sample label if the overlapping degree of the fifth reference frame and any first reference frame in the initial sample image is smaller than or equal to the second preset threshold, and use the partial sample image labeled with the negative sample label as the training image in the first training data set.

In some embodiments, the processing module 71 is configured to acquire a plurality of continuous video frames shot by the shooting device; and determine whether the moving target exists in the shooting site of the shooting device by adopting the frame difference method according to the plurality of continuous video frames; if the moving target exists, taking the video frame shot by the shooting device as the image to be detected.

In addition, the embodiment of the present disclosure further provides a control apparatus for a broadcast monitoring system corresponding to the control method for a broadcast monitoring system in the second aspect. As the principle of solving the problem of the control apparatus for a broadcast monitoring system in the embodiment of the present disclosure is similar to that of the control method for a broadcast monitoring system in the second aspect in the embodiment of the present disclosure, the implementation of the control apparatus for a broadcast monitoring system may refer to that of the corresponding method in the second aspect, and repeated parts are not described again.

Figure 8:
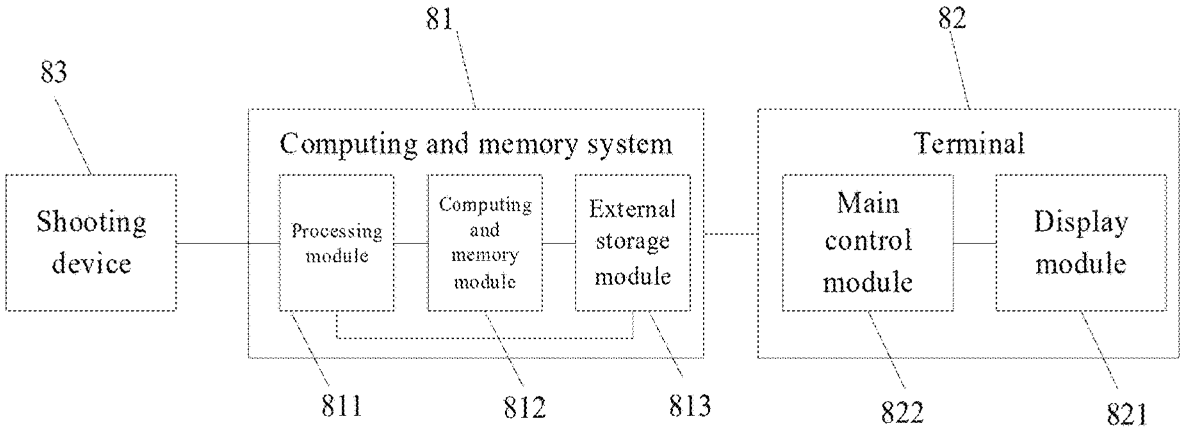
FIG. 8 is a schematic diagram of a control apparatus for a broadcast monitoring system according to an embodiment of the present disclosure.

FIG. 8 is a schematic diagram of a control apparatus for a broadcast monitoring system according to an embodiment of the present disclosure. As shown in FIG. 8, the control apparatus includes a computing and memory system 81 and a terminal 82. The computing and memory system includes a processing module 811, a computing and memory module 812, and an external storage module 813. The processing module is, for example, a main processor CPU in the computing and memory system, the computing and memory module may be, for example, a storage and computing core integrated with the flash or the SRAM, and the external storage module may be, for example, an external storage module DRAM, so that the faster response speed is achieved, and the power consumption of the broadcast monitoring system is reduced. The computing and memory system may be a part of the broadcast monitoring system. Meanwhile, the lightweight target neural network model designed in the present disclosure is migrated into the computing and memory module, and assistantly in a low-power-consumption computing and memory mode may help the target neural network to realize inference, so that the awakening service for the intelligent terminal is completed, the power consumption is reduced, and the faster response speed is achieved.

The processing module 811 is configured to acquire an image to be detected; divide the image to be detected into a plurality of target sub-images according to a shooting visual angle of the shooting device for shooting the image to be detected, and store the plurality of target sub-images in the external storage module 813.

The computing and memory module 812 is configured to read the plurality of target sub-images; process each target sub-image in the plurality of target sub-images by using a pre-trained target neural network model to obtain a recognition result for the target sub-image, and store the recognition result in the external storage module 813.

The processing module 811 is configured to obtain the detection result of whether the target object exists in the image to be detected or not based on the recognition result corresponding to each target sub-image, and send the detection result to the terminal 82.

The terminal 82 is configured to determine a display state based on the detection result.

In some embodiments, the terminal 82 includes a display module 821 and a main control module 822. The main control module 822 is configured to send an awakening request to the display module and reset a sleep timer when it is determined that the detection result indicates that the target object exists in the image to be detected, to receive the detection result sent from the processing module in response to a terminal request; and send a sleep request to the display module to control the main control module to enter the sleep state when it is determined that the detection result indicates that the target object does not exist in the image to be detected and a difference between the current system time and the latest awakening time of the display module is longer than a preset duration. The display module 821 is configured to determine that the display state is normally displaying a picture shot by the shooting device in response to the awakening request; and determine that the display state is sleep in response to the sleep request.

In some embodiments, the control apparatus for a broadcast monitoring system further includes a shooting device 83, and the image dividing module 811 may obtain data of the shooting device 83 with the low power consumption through the SPI protocol or other protocol.

The embodiment of the present disclosure further provides a non-transitory computer readable storage medium. The non-transitory computer readable storage medium has a computer program stored thereon, the computer program, when being executed by a processor, causes the processor to perform steps of the control method for a broadcast monitoring system in any one of the embodiments.

In particular, according to the embodiments of the present disclosure, the processes described above with reference to the flowcharts may be implemented as computer software programs. For example, the embodiments of the present disclosure provide a computer program product, including a computer program embodied on a machine-readable medium, the computer program includes program codes for performing the method illustrated in the flowcharts. In such an embodiment, the computer program may be downloaded from a network via a communication portion and installed, and/or installed from a removable medium. The computer program, when executed by a central processing unit (CPU), causes the central processing unit to perform the above functions defined in the system of the present disclosure.

It should be noted that the non-transitory computer readable medium shown in the present disclosure may be a computer readable signal medium or a computer readable storage medium or any combination thereof. The computer readable storage medium may be, for example, but not limited to, an electronic, magnetic, optical, electromagnetic, infrared, or semiconductor system, apparatus, or device, or any combination thereof. More specific examples of the computer readable storage medium may include, but are not limited to: an electrical connection having one or more wires, a portable computer disk, a hard disk, a random access memory (RAM), a read-only memory (ROM), an erasable programmable read-only memory (EPROM) or a flash, an optical fiber, a portable compact disc read-only memory (CD-ROM), an optical storage device, a magnetic storage device, or any suitable combination therefore. In the present disclosure, the computer readable storage medium may be any tangible medium that can contain or store a program for use by or in connection with an instruction execution system, apparatus, or device. In contrast, in the present disclosure, the computer readable signal medium may include a propagated data signal with computer readable program code embodied therein, for example, in baseband or as part of a carrier wave. Such the propagated data signal may take any of a variety of forms, including, but not limited to, an electromagnetic signal, an optical signal, or any suitable combination thereof. The computer readable signal medium may be any non-transitory computer readable storage medium except for the computer readable storage medium, and the non-transitory computer readable storage medium may transmit, propagate, or transport a program for use by or in connection with an instruction execution system, apparatus, or device. The program code embodied on the non-transitory computer readable storage medium may be transmitted in any appropriate way, including, but not limited to: wirelessly, through wires, fiber optic cables, RF (radio frequency) or the like, or any suitable combination thereof.

The flowchart and block diagrams in the drawings illustrate architecture, functionality, and operation of possible implementations of a device, a method and a computer program product according to various embodiments of the present disclosure. In this regard, each block in the flowchart or block diagrams may represent a module, program segment(s), or a portion of a code, which includes one or more executable instructions for implementing specified logical function(s). It should also be noted that, in some alternative implementations, functions noted in the blocks may occur out of the order noted in the drawings. For example, two blocks connected to each other may, in fact, be performed substantially concurrently, or the blocks may sometimes be performed in the reverse order, depending upon the functionality involved. It will also be noted that each block of the block diagrams and/or flowchart, and combinations of blocks in the block diagrams and/or flowchart, may be implemented by special purpose hardware-based systems that perform the specified functions or operations, or combinations of special purpose hardware and computer instructions.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A control method for a broadcast monitoring system, comprising:
- acquiring an image to be detected;
- dividing the image to be detected into a plurality of target sub-images according to a shooting visual angle of a shooting device for shooting the image to be detected;
- processing each of the plurality of target sub-images by using a pre-trained target neural network model to obtain a recognition result for the target sub-image; and
- obtaining a detection result of whether a target object exists in the image to be detected or not based on the recognition result corresponding to each target sub-image, and sending the detection result to a terminal, so that the terminal determines a display state at least based on the detection result,
- wherein dividing the image to be detected into the plurality of target sub-images according to the shooting visual angle of the shooting device, comprises:
- dividing the image to be detected into a first sub-region, a second sub-region and a third sub-region arranged sequentially along a first direction, in response to the shooting visual angle being within a preset visual angle range, wherein the first sub-region and the third sub-region partially overlap with the second sub-region, a width of the first sub-region in the first direction is equal to a width of the third sub-region in the first direction, and a width of the second sub-region in the first direction is greater than the width of the first sub-region in the first direction, and the first direction is a height direction of the image to be detected;
- dividing a part of the image to be detected in the first sub-region into a plurality of first sub-images arranged side by side along a second direction, wherein widths of at least part of the first sub-images in the second direction are the same, and the second direction is a width direction of the image to be detected;
- dividing a part of the image to be detected in the second sub-region into a plurality of second sub-images arranged side by side along the second direction, wherein widths of at least part of the second sub-images in the second direction are the same; and
- dividing a part of the image to be detected in the third sub-region into a plurality of third sub-images arranged side by side along the second direction, wherein widths of at least part of the third sub-images in the second direction are the same, and each of the plurality of target sub-images comprises a first sub-image, a second sub-image, and a third sub-image;
- wherein a width of the third sub-image in the second direction is larger than a width of the second sub-image in the second direction, which is larger than the width of the first sub-image in the second direction.

2. The control method according to claim 1, wherein the adjacent first sub-images at least partially overlap with each other in the second direction; the adjacent second sub-images at least partially overlap with each other in the second direction; and the third sub-images do not overlap with each other in the second direction.

3. The control method according to claim 2, wherein
- a ratio of the width of the second sub-region in the first direction to the width of the first sub-region in the first direction is 2:1; and
- a ratio of the widths of the third sub-image and the second sub-image in the second direction is 3:2, and
- a ratio of the widths of the second sub-image and the first sub-image in the second direction is 4:3.

4. The control method according to claim 2, wherein
- in the plurality of first sub-images arranged side by side in the second direction, the remaining first sub-images, except for a 1st first sub-image and a last first sub-image arranged side by side in the second direction, have a same width in the second direction; the 1st first sub-image and the last first sub-image have a same width in the second direction smaller than the width of the remaining first sub-image in the second direction; and a ratio of an overlapping width of two adjacent first sub-images in the second direction to the width of the remaining first sub-image in the second direction is 1:10;
- in the plurality of second sub-images arranged side by side in the second direction, the remaining second sub-images, except for the 1st second sub-image and the last second sub-image arranged side by side in the second direction, have the same width in the second direction; the 1st second sub-image and the last second sub-image have the same width in the second direction, which is smaller than the width of the remaining second sub-images in the second direction; and a ratio of an overlapping width of two adjacent second sub-images in the second direction to the width of the remaining second sub-images in the second direction is 1:10;
- in the plurality of third sub-images arranged side by side in the second direction, the remaining third sub-images, except for a 1st third sub-image and a last third sub-image arranged side by side in the second direction, have a same width in the second direction; the 1st third sub-image and the last third sub-image have a same width in the second direction smaller than the width of the remaining third sub-image in the second direction; a ratio of an overlapping width of two adjacent third sub-images in the second direction to the width of the remaining third sub-image in the second direction is 1:10; and
- a ratio of an overlapping width in the first direction of a first sub-image and a second sub-image adjacent to each other in the first direction to the width of the second sub-image in the first direction is 1:10, and a ratio of an overlapping width in the first direction of a third sub-image and a second sub-image adjacent to each other in the first direction to the width of the second sub-image in the first direction is 1:10.

5. The control method according to claim 1, wherein the target neural network model is trained by following steps:

acquiring a first training data set and a second training data set, wherein the second training data set is obtained by filtering the first training data set;

training a teacher machine learning model to be trained according to the first training data set to obtain a preliminarily trained teacher machine learning model;

training the preliminarily trained teacher machine learning model according to the second training data set to obtain the trained teacher machine learning model; and training a student machine learning model to be trained by adopting a knowledge distillation training method according to the second training data set and the trained teacher machine learning model, to obtain the trained student machine learning model as the target neural network model.

6. The control method according to claim 5, wherein the second training data set comprises a plurality of training images labeled with the sample labels;

training the student machine learning model to be trained by adopting the knowledge distillation training method according to the second training data set and the trained teacher machine learning model, to obtain the trained student machine learning model as the target neural network model, comprises:

inputting the training image into the trained teacher machine learning model to obtain a first output result for the trained teacher machine learning model;

inputting the training image into the student machine learning model to be trained to obtain a second output result for the student machine learning model to be trained;

determining a first loss function according to the first output result and the second output result;

determining a second loss value according to the second output result and the sample label of the training image;

obtaining a weighted loss function according to the first loss function and the second loss function; and adjusting parameters of the student machine learning model to be trained according to the weighted loss function until the weighted loss function is converged, to obtain the trained student machine learning model as the target neural network model.

7. The control method according to claim 6, wherein acquiring the first training data set comprises:

acquiring an original data set, wherein the original data set comprises a plurality of initial sample images;

performing a target object recognition on the initial sample image; and determining a first reference frame containing the target object in response to the target object being present;

updating a position of the first reference frame according to position information of the first reference frame to obtain a second reference frame;

determining an overlapping degree of the second reference frame and the first reference frame according to position information of the second reference frame and the position information of the first reference frame; and labeling a sample label for a partial sample image of the initial sample images in the second reference frame according to a comparison result between the overlapping degree and a first preset threshold, and taking the partial sample image labeled with the sample label as the training image in the first training data set.

8. The control method according to claim 7, wherein updating the position of the first reference frame according to the position information of the first reference frame to obtain the second reference frame, comprises:

moving a specific coordinate point in the first reference frame according to the position information of the first reference frame to obtain a third reference frame;

adjusting a width and a height of the third reference frame based on a preset scaling factor according to position information of the third reference frame by taking a central point of the third reference frame as a center, to obtain a fourth reference frame; and determining a new central point according to position information of the fourth reference frame and first preset central point range; and adjusting a width and a height of the fourth reference frame according to the new central point and a preset cropping range to obtain the second reference frame.

9. The control method according to claim 7, wherein labeling the sample label for the partial sample image of the initial sample images in the second reference frame according to the comparison result between the overlapping degree and the first preset threshold, comprises:

in response to the overlapping degree being greater than or equal to the first preset threshold, generating a first preset range according to a first preset probability, generating a second preset range according to a second preset probability, generating a third preset range according to a third preset probability, and generating a fourth preset range according to a fourth preset probability; wherein the first preset probability is greater than the second preset probability, the second preset probability is greater than the third preset probability, and the third preset probability is greater than or equal to the fourth preset probability; a sum of the first preset probability, the second preset probability, the third preset probability and the fourth preset probability is 1;

in response to the overlapping degree being within the first preset range, determining and labeling a partial sample image of the initial sample image in the second reference frame as a positive sample label, so that a ratio of a number of training images with the overlapping degree within the first preset range to a total number of training images with the positive sample labels in the first training data set is the first preset probability;

in response to the overlapping degree being within the second preset range, determining and labeling a partial sample image of the initial sample images in the second reference frame as a positive sample label, so that a ratio of a number of training images with the overlapping degree within the second preset range to a total number of training images with the positive sample labels in the first training data set is the second preset probability;

in response to the overlapping degree being within the third preset range, determining and labeling a partial sample image of the initial sample image in the second reference frame as a positive sample label, so that a ratio of a number of training images with the overlapping degree within the third preset range to a total number of training images with the positive sample labels in the first training data set is the third preset probability; and in response to the overlapping degree being within the fourth preset range, determining and labeling a partial sample image of the initial sample image in the second reference frame as a positive sample label, so that a ratio of a number of training images with the overlapping degree within the fourth preset range to a total number of training images with the positive sample labels in the first training data set is the fourth preset probability;

wherein the overlapping degree in the first preset range is smaller than the overlapping degree in the second preset range, the overlapping degree in the second preset range is smaller than the overlapping degree in the third preset range, and the overlapping degree in the third preset range is smaller than the overlapping degree in the fourth preset range.

10. The control method according to claim 7, wherein in step of acquiring the first training data set, in response to no target object being present when performing the target object recognition on the initial sample image, the control method further comprises:

labeling the initial sample image with a negative sample label, and taking the initial sample image labeled with the negative sample label as a training image in the first training data set.

11. The control method according to claim 7, wherein after performing the target object recognition on the initial sample image; and determining a first reference frame containing the target object in response to the target object being present, the control method further comprises:

determining a target central point in the initial sample image according to a size of the initial sample image and the second preset central point range, and determining a fifth reference frame by taking the target central point as a center;

determining an overlapping degree of the fifth reference frame and any first reference frame in the initial sample image according to position information of the fifth reference frame and the position information of the first reference frame; and labeling a partial sample image of the initial sample image in the fifth reference frame as a negative sample label in response that the overlapping degree of the fifth reference frame and any first reference frame in the initial sample image is smaller than or equal to a second preset threshold, and using the partial sample image labeled with the negative sample label as the training image in the first training data set.

12. The control method according to claim 1, wherein acquiring the image to be detected, comprises:

acquiring a plurality of continuous video frames shot by the shooting device; and determining whether a moving target exists in a shooting site of the shooting device by adopting a frame difference method according to the plurality of continuous video frames; and taking the video frame shot by the shooting device as the image to be detected in response to the moving target existing.

13. A non-transitory computer readable storage medium, wherein the non-transitory computer readable storage medium has a computer program stored thereon, and the computer program, when being executed by a processor, causes the processor to perform the control method according to claim 1.

14. A control method for a broadcast monitoring system, wherein the broadcast monitoring system comprises a computing and memory system and a terminal; the computing and memory system comprises a processing module, a computing and memory module and an external storage module; and the control method comprises:

acquiring, by the processing module, an image to be detected, dividing the image to be detected into a plurality of target sub-images according to a shooting visual angle of a shooting device for shooting the image to be detected, and storing the plurality of target sub-images in the external storage module;

reading, by the computing and memory module, the plurality of target sub-images, processing each of the plurality of target sub-images by using a pre-trained target neural network model to obtain a recognition result for the target sub-image, and storing the recognition result in the external storage module;

obtaining, by the processing module, a detection result of whether a target object exists in the image to be detected or not based on the recognition result corresponding to each target sub-image, and sending the detection result to the terminal; and determining, by the terminal, a display state based on the detection result, wherein dividing the image to be detected into the plurality of target sub-images according to the shooting visual angle of the shooting device, comprises:

dividing the image to be detected into a first sub-region, a second sub-region and a third sub-region arranged sequentially along a first direction, in response to the shooting visual angle being within a preset visual angle range, wherein the first sub-region and the third sub-region partially overlap with the second sub-region, a width of the first sub-region in the first direction is equal to a width of the third sub-region in the first direction, and a width of the second sub-region in the first direction is greater than the width of the first sub-region in the first direction, and the first direction is a height direction of the image to be detected;

dividing a part of the image to be detected in the first sub-region into a plurality of first sub-images arranged side by side along a second direction, wherein widths of at least part of the first sub-images in the second direction are the same, and the second direction is a width direction of the image to be detected;

dividing a part of the image to be detected in the second sub-region into a plurality of second sub-images arranged side by side along the second direction, wherein widths of at least part of the second sub-images in the second direction are the same; and dividing a part of the image to be detected in the third sub-region into a plurality of third sub-images arranged side by side along the second direction, wherein widths of at least part of the third sub-images in the second direction are the same, and each of the plurality of target sub-images comprises a first sub-image, a second sub-image, and a third sub-image;

wherein a width of the third sub-image in the second direction is larger than a width of the second sub-image in the second direction, which is larger than the width of the first sub-image in the second direction.

15. The control method according to claim 14, wherein the terminal comprises a display module and a main control module;

determining, by the terminal, the display state based on the detection result, comprises:

sending, by the main control module, an awakening request to the display module and resetting a sleep timer in response the detection result indicates that the target object exists in the image to be detected, to receive the detection result sent from the processing module in response to a terminal request; and sending, by the main control module, a sleep request to the display module to control the main control module to enter a sleep state in response that the detection result indicates that the target object does not exist in the image to be detected and a difference between a current system time and a latest awakening time of the display module is longer than a preset duration; and determining, by the display module, that the display state is normally displaying a picture shot by the shooting device in response to the awakening request; and determining, by the display module, that the display state is sleep in response to the sleep request.

16. A computing and memory system, comprising a processing module, a computing and memory module and an external storage module; wherein the processing module is configured to acquire an image to be detected; divide the image to be detected into a plurality of target sub-images according to a shooting visual angle of the shooting device for shooting the image to be detected, and store the plurality of target sub-images in the external storage module;

the computing and memory module is configured to read the plurality of target sub-images; process each of the plurality of target sub-images by using a pre-trained target neural network model to obtain a recognition result for the target sub-image, and store the recognition result in the external storage module; and the processing module is configured to obtain a detection result of whether a target object exists in the image to be detected or not based on the recognition result corresponding to each target sub-image, and send the detection result to a terminal so that the terminal determines a display state based on the detection result, wherein the processing module is further configured to:

divide the image to be detected into a first sub-region, a second sub-region and a third sub-region arranged sequentially along a first direction, in response to the shooting visual angle being within a preset visual angle range, wherein the first sub-region and the third sub-region partially overlap with the second sub-region, a width of the first sub-region in the first direction is equal to a width of the third sub-region in the first direction, and a width of the second sub-region in the first direction is greater than the width of the first sub-region in the first direction, and the first direction is a height direction of the image to be detected;

divide a part of the image to be detected in the first sub-region into a plurality of first sub-images arranged side by side along a second direction, wherein widths of at least part of the first sub-images in the second direction are the same, and the second direction is a width direction of the image to be detected;

divide a part of the image to be detected in the second sub-region into a plurality of second sub-images arranged side by side along the second direction, wherein widths of at least part of the second sub-images in the second direction are the same; and divide a part of the image to be detected in the third sub-region into a plurality of third sub-images arranged side by side along the second direction, wherein widths of at least part of the third sub-images in the second direction are the same, and each of the plurality of target sub-images comprises a first sub-image, a second sub-image, and a third sub-image;

wherein a width of the third sub-image in the second direction is larger than a width of the second sub-image in the second direction, which is larger than the width of the first sub-image in the second direction.

* * * * *